(12) United States Patent
Chen et al.

(10) Patent No.: US 10,863,559 B2
(45) Date of Patent: *Dec. 8, 2020

(54) METHOD AND APPARATUS FOR COMMUNICATING IN A WIRELESS COMMUNICATION NETWORK

(71) Applicant: HUAWEI TECHNOLOGIES CO., LTD., Guangdong (CN)

(72) Inventors: Ji Chen, Shenzhen (CN); Ping Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,036

(22) Filed: May 10, 2019

(65) Prior Publication Data

US 2019/0268951 A1 Aug. 29, 2019

Related U.S. Application Data

(63) Continuation of application No. 15/506,809, filed as application No. PCT/CN2015/085439 on Jul. 29, 2015, now Pat. No. 10,321,494.

(30) Foreign Application Priority Data

Aug. 27, 2014 (CN) .......................... 2014 1 0429195
Sep. 1, 2014 (CN) .......................... 2014 1 0440017

(51) Int. Cl.
*H04W 76/14* (2018.01)
*H04W 76/11* (2018.01)
(Continued)

(52) U.S. Cl.
CPC .......... *H04W 76/11* (2018.02); *H04L 67/104* (2013.01); *H04L 67/16* (2013.01); *H04W 12/06* (2013.01);
(Continued)

(58) Field of Classification Search
CPC ..... H04W 76/11; H04W 76/14; H04W 12/06; H04W 76/23; H04W 84/12; H04W 76/10;
(Continued)

(56) References Cited

U.S. PATENT DOCUMENTS 9,609,676 B1 3/2017 Bijwe
2005/0135305 A1* 6/2005 Wentink ................ H04W 88/04
370/329
(Continued)

FOREIGN PATENT DOCUMENTS

CN 101965064 A 2/2011
CN 103380654 A 10/2013
(Continued)

OTHER PUBLICATIONS

Chinese Office Action issued in Chinese Application No. 201410440017.9 dated Dec. 25, 2018, 5 pages.
(Continued)

*Primary Examiner* — Un C Cho
*Assistant Examiner* — Lalita W Pace
(74) *Attorney, Agent, or Firm* — Fish & Richardson P.C.

(57) ABSTRACT

A communication method and a device, where the method includes receiving, by a first device, a first message sent by a second device using a peer-to-peer (P2P) network, where the first message includes address information of the second device in an infrastructure network and identification information of a radio access device connected to the second device in the infrastructure network, and if a radio access device connected to the first device and the radio access device connected to the second device in the infrastructure network are a same radio access device, communicating, by the first device, with the second device according to the address information using the connected radio access device.

19 Claims, 14 Drawing Sheets

(51) Int. Cl.
*H04W 76/23* (2018.01)
*H04L 29/08* (2006.01)
*H04W 12/06* (2009.01)
*H04L 29/12* (2006.01)
*H04W 84/12* (2009.01)

(52) U.S. Cl.
CPC ........... *H04W 76/14* (2018.02); *H04W 76/23* (2018.02); *H04L 61/6022* (2013.01); *H04W 84/12* (2013.01)

(58) Field of Classification Search
CPC ...... H04W 92/18; H04L 67/104; H04L 67/16; H04L 61/6022; H04L 61/30; H04L 29/08306; H04L 29/12009; H04L 29/08423
See application file for complete search history.

(56) References Cited

U.S. PATENT DOCUMENTS

| | | | |
|---|---|---|---|
| 2011/0103264 A1 | 5/2011 | Wentink | |
| 2012/0163235 A1 | 6/2012 | Ho et al. | |
| 2013/0281020 A1* | 10/2013 | Montemurro | H04W 76/16 455/41.2 |
| 2013/0308598 A1 | 11/2013 | Madan et al. | |
| 2014/0006633 A1 | 1/2014 | Uchikawa | |
| 2014/0064198 A1 | 3/2014 | Pan et al. | |
| 2014/0153557 A1 | 6/2014 | Kim et al. | |

FOREIGN PATENT DOCUMENTS

| | | |
|---|---|---|
| CN | 103687048 A | 3/2014 |
| CN | 103857065 A | 6/2014 |
| EP | 2753122 A2 | 7/2014 |

OTHER PUBLICATIONS

Chinese Search Report issued in Chinese Application No. 2014104400179 dated Dec. 5, 2018, 2 pages.

Foreign Communication From a Counterpart Application, European application No. 15835719.4, Extended European Search Report dated Jul. 25, 2017, 7 pages.

Foreign Communication From a Counterpart Application, PCT Application No. PCT/CN2015/085439, English Translation of International Search Report dated Oct. 29, 2015, 2 pages.

"Foreign Communication From a Counterpart Application, PCT Application No. PCT/CN2015/085439, English Translation of Written Opinion dated Oct. 29, 2015, 7 pages."

Machine Translation and Abstract of Chinese Publication No. CN101965064, Feb. 2, 2011, 6 pages.

"Wi-Fi Alliance Technical Committee Wi-Fi Direct Services Task Group," Wi-Fi Direct Services Draft Technical Specification Version 0.5, Nov. 19, 2013, 111 pages.

Wi-Fi Peer-lo-Peer (P2P) Technical Specification, Version 1.5, 2014, 184 pages.

* cited by examiner

US 10,863,559 B2

METHOD AND APPARATUS FOR COMMUNICATING IN A WIRELESS COMMUNICATION NETWORK

CROSS-REFERENCE TO RELATED APPLICATIONS

This application is a continuation of U.S. patent application Ser. No. 15/506,809, filed on Feb. 27, 2017, which is a national stage of International Application No. PCT/CN2015/085439, filed on Jul. 29, 2015, which claims priority to Chinese Patent Application No. 201410429195.1 filed on Aug. 27, 2014 and Chinese Patent Application No. 201410440017.9 filed on Sep. 1, 2014. All of the aforementioned applications are hereby incorporated by reference in their entireties.

TECHNICAL FIELD

The present disclosure relates to the field of communications technologies, and in particular, to a communication method and a device.

BACKGROUND

Ever since a wireless local area network standard Institute of Electrical and Electronics Engineers (IEEE) 802.11 was released in 1997, greatly driven by the WI-FI ALLIANCE (WFA) that is formed by many industry-leading companies, WI-FI develops rapidly for its advantages such as fast deployment, easy to use, and a high transmission rate. Because current notebook computers, tablet computers, mobile phones, numerous electronic terminal devices, and the like all support the WI-FI technology, the WI-FI technology is widely applied to various industries.

In a network structure of WI-FI, a radio access device is included, and other devices may communicate with each other using the radio access device. The radio access device may be referred to as infrastructure, and the network may be referred to as an infrastructure network. The device may be a terminal device, such as a mobile phone or a television. The infrastructure may be a home gateway or the like.

In another network structure of WI-FI, devices communicate with each other directly. This network structure is referred to as an end-to-end network, that is, a peer-to-peer (P2P) network. The device may be a terminal device, such as a mobile phone or a television.

In conclusion, for a network connection, due to differences between networks in use, networks of the following different network structures exist. One is a network structure based on infrastructure of a basic 802.11 protocol, and the other is a P2P network structure based on a P2P protocol. The P2P protocol may be the WFA's WI-FI Direct protocol, Neighbor Awareness Networking (NAN) protocol, or the like.

In some approaches, these two types of network structures are mutually independent. A device may use either of the network structures according to a specific situation when performing a service. However, because a change of a device position causes a change in a network signal, in this case, if a service is performed regularly in one network structure, network quality fluctuates, and user experience is poor.

SUMMARY

Embodiments of the present disclosure provide a communication method and a device, to effectively relieve a situation in which network quality fluctuates when a P2P network is in use, and ensuring communication quality and good user experience.

A first aspect of the embodiments of the present disclosure provides a communication method, including receiving, by a first device, a first message sent by a second device using a P2P network, where the first message includes address information of the second device in an infrastructure network and identification information of a radio access device connected to the second device in the infrastructure network, and when a radio access device connected to the first device and the radio access device connected to the second device in the infrastructure network are a same radio access device, communicating, by the first device, with the second device according to the address information using the same radio access device.

With reference to the first aspect of the embodiments of the present disclosure, in a first implementation manner of the first aspect of the embodiments of the present disclosure, where a radio access device connected to the first device and the radio access device connected to the second device in the infrastructure network are a same radio access device, the first device determines that identification information of the radio access device connected to the first device matches the identification information of the radio access device connected to the second device in the infrastructure network.

With reference to the first aspect of the embodiments of the present disclosure, in a second implementation manner of the first aspect of the embodiments of the present disclosure, where a radio access device connected to the first device and the radio access device connected to the second device in the infrastructure network are a same radio access device, the first device accesses the radio access device connected to the second device in the infrastructure network after the first device determines that identification information of the radio access device connected to the first device does not match the identification information of the radio access device connected to the second device in the infrastructure network.

With reference to the first aspect, the first implementation manner of the first aspect, or the second implementation manner of the first aspect of the embodiments of the present disclosure, in a third implementation manner of the first aspect of the embodiments of the present disclosure, communicating, by the first device, with the second device according to the address information using the same radio access device includes sending, by the first device, information to the second device according to the address information of the second device in the infrastructure network using the same radio access device, where the information includes address information of the first device in the infrastructure network.

With reference to the third implementation manner of the first aspect of the embodiments of the present disclosure, in a fourth implementation manner of the first aspect of the embodiments of the present disclosure, communicating, by the first device, with the second device according to the address information using the same radio access device further includes receiving, by the first device, information sent by the second device according to the address information of the first device in the infrastructure network using the same radio access device.

With reference to the first aspect, the first implementation manner of the first aspect, or the second implementation manner of the first aspect of the embodiments of the present disclosure, in a fifth implementation manner of the first aspect of the embodiments of the present disclosure, before communicating, by the first device, with the second device according to the address information using the same radio access device, the method further includes sending, by the first device, a second message to the second device using the P2P network or the infrastructure network, where the second message includes address information of the first device in the infrastructure network, and communicating, by the first device, with the second device according to the address information using the same radio access device includes sending, by the first device, information to the second device according to the address information of the second device in the infrastructure network using the same radio access device, and/or receiving, by the first device, information sent by the second device according to the address information of the first device in the infrastructure network using the same radio access device.

With reference to the first aspect, the first implementation manner of the first aspect, the second implementation manner of the first aspect, the third implementation manner of the first aspect, the fourth implementation manner of the first aspect, or the fifth implementation manner of the first aspect of the embodiments of the present disclosure, in a sixth implementation manner of the first aspect of the embodiments of the present disclosure, the first message further includes first authentication data, and the first authentication data is used for authentication between the first device and the second device.

With reference to the first aspect, the first implementation manner of the first aspect, the second implementation manner of the first aspect, the third implementation manner of the first aspect, the fourth implementation manner of the first aspect, the fifth implementation manner of the first aspect of the embodiments of the present disclosure, or the sixth implementation manner of the first aspect, in a seventh implementation manner of the first aspect of the embodiments of the present disclosure, the P2P network is a WI-FI P2P network, and the infrastructure network is a WI-FI infrastructure network.

A second aspect of the embodiments of the present disclosure provides a communication method, including sending, by a second device, a first message to a first device using a P2P network, where the first message includes address information of the second device in an infrastructure network and identification information of a radio access device connected to the second device in the infrastructure network, and communicating, by the second device, with the first device using the same radio access device when a radio access device connected to the first device and the radio access device connected to the second device in the infrastructure network are a same radio access device.

With reference to the second aspect of the embodiments of the present disclosure, in a first implementation manner of the second aspect of the embodiments of the present disclosure, communicating, by the second device, with the first device using the same radio access device includes receiving, by the second device, information sent by the first device using the same radio access device, where the information includes address information of the first device in the infrastructure network.

With reference to the first implementation manner of the second aspect of the embodiments of the present disclosure, in a second implementation manner of the second aspect of the embodiments of the present disclosure, communicating, by the second device, with the first device using the same radio access device further includes sending, by the second device, information to the first device according to the address information of the first device in the infrastructure network using the same radio access device.

With reference to the second aspect of the embodiments of the present disclosure, in a third implementation manner of the second aspect of the embodiments of the present disclosure, before communicating, by the second device, with the first device using the same radio access device, the method further includes receiving, by the second device, a second message sent by the first device using the P2P network or the infrastructure network, where the second message includes address information of the first device in the infrastructure network, and communicating, by the second device, with the first device using the same radio access device includes sending, by the second device, information to the first device according to the address information of the first device in the infrastructure network using the same radio access device, and/or receiving, by the second device, information sent by the first device according to the address information of the second device in the infrastructure network using the same radio access device.

With reference to the second aspect, the first implementation manner of the second aspect, the second implementation manner of the second aspect, or the third implementation manner of the second aspect of the embodiments of the present disclosure, in a fourth implementation manner of the second aspect of the embodiments of the present disclosure, the first message further includes first authentication data, and the first authentication data is used for authentication between the second device and the first device.

With reference to the second aspect, the first implementation manner of the second aspect, the second implementation manner of the second aspect, the third implementation manner of the second aspect, or the fourth implementation manner of the second aspect of the embodiments of the present disclosure, in a fifth implementation manner of the second aspect of the embodiments of the present disclosure, the P2P network is a WI-FI P2P network, and the infrastructure network is a WI-FI infrastructure network.

A third aspect of the embodiments of the present disclosure provides a device, including a receiving unit configured to receive a first message sent by a target device using a P2P network, where the first message includes address information of the target device in an infrastructure network and identification information of a radio access device connected to the target device in the infrastructure network, and when a radio access device connected to the device and the radio access device connected to the target device in the infrastructure network are a same radio access device, a communications unit configured to communicate with the target device according to the address information using the same radio access device.

With reference to the third aspect of the embodiments of the present disclosure, in a first implementation manner of the third aspect of the embodiments of the present disclosure, when the device determines that identification information of the radio access device connected to the device matches the identification information of the radio access device connected to the target device in the infrastructure network, the communications unit is further configured to communicate with the target device according to the address information using the same radio access device.

With reference to the third aspect of the embodiments of the present disclosure, in a second implementation manner of the third aspect of the embodiments of the present disclosure, after the device determines that identification information of the radio access device connected to the device does not match the identification information of the radio access device connected to the target device in the infrastructure network, the communications unit is further configured to access the radio access device connected to the target device in the infrastructure network and communicate with the target device according to the address information using the same radio access device.

With reference to the third aspect, the first implementation manner of the third aspect, or the second implementation manner of the third aspect of the embodiments of the present disclosure, in a third implementation manner of the third aspect of the embodiments of the present disclosure, the communications unit includes a first sending module configured to send information to the target device according to the address information of the target device in the infrastructure network using the same radio access device, where the information includes address information of the device in the infrastructure network.

With reference to the third implementation manner of the third aspect of the embodiments of the present disclosure, in a fourth implementation manner of the third aspect of the embodiments of the present disclosure, the communications unit further includes a first receiving module configured to receive information sent by the target device according to the address information of the device in the infrastructure network using the same radio access device.

With reference to the third aspect, the first implementation manner of the third aspect, or the second implementation manner of the third aspect of the embodiments of the present disclosure, in a fifth implementation manner of the third aspect of the embodiments of the present disclosure, the device further includes a sending unit configured to send a second message to the target device using the P2P network or the infrastructure network before the communications unit communicates with the target device according to the address information using the same radio access device, where the second message includes address information of the device in the infrastructure network, and the communications unit includes a second sending module configured to send information to the target device according to the address information of the target device in the infrastructure network using the same radio access device, and/or a second receiving module configured to receive information sent by the target device according to the address information of the device in the infrastructure network using the same radio access device.

A fourth aspect of the embodiments of the present disclosure provides a device, including a sending unit configured to send a first message to a target device using a P2P network, where the first message includes address information of the device in an infrastructure network and identification information of a radio access device connected to the device in the infrastructure network, and when a radio access device connected to the target device and the radio access device connected to the device in the infrastructure network are a same radio access device, a communications unit configured to communicate with the target device using the same radio access device.

With reference to the fourth aspect of the embodiments of the present disclosure, in a first implementation manner of the fourth aspect of the embodiments of the present disclosure, the communications unit includes a first receiving module configured to receive information sent by the target device using the same radio access device, where the information includes address information of the target device in the infrastructure network.

With reference to the first implementation manner of the fourth aspect of the embodiments of the present disclosure, in a second implementation manner of the fourth aspect of the embodiments of the present disclosure, the communications unit further includes a first sending module configured to send information to the target device according to the address information of the target device in the infrastructure network using the same radio access device.

With reference to the fourth aspect of the embodiments of the present disclosure, in a third implementation manner of the fourth aspect of the embodiments of the present disclosure, the device further includes a receive unit configured to receive a second message sent by the target device using the P2P network or the infrastructure network before the communications unit communicates with the target device using the same radio access device, where the second message includes address information of the target device in the infrastructure network, and the communications unit includes a second sending module configured to send information to the target device according to the address information of the target device in the infrastructure network using the same radio access device, and/or a second receiving module configured to receive information sent by the target device according to the address information of the device in the infrastructure network using the same radio access device.

It can be learned from the foregoing technical solutions that the embodiments of the present disclosure have the following advantages.

A first device may receive a message sent by a second device using a P2P network when communicating with the second device using the P2P network. When a radio access device connected to the first device and a radio access device connected to the second device in an infrastructure network are a same radio access device, the first device may communicate with the second device using the radio access device in the infrastructure network. In a process of performing communication using the P2P network, the first device may perform communication using the infrastructure network. Therefore, a situation in which network quality fluctuates when a P2P network is in use is effectively relieved, communication quality is ensured, and user experience is good.

DESCRIPTION OF EMBODIMENTS

Embodiments of the present disclosure provide a communication method and a device, which are used to ensure communication quality and improve user experience.

To make persons skilled in the art understand the technical solutions in the present disclosure better, the following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
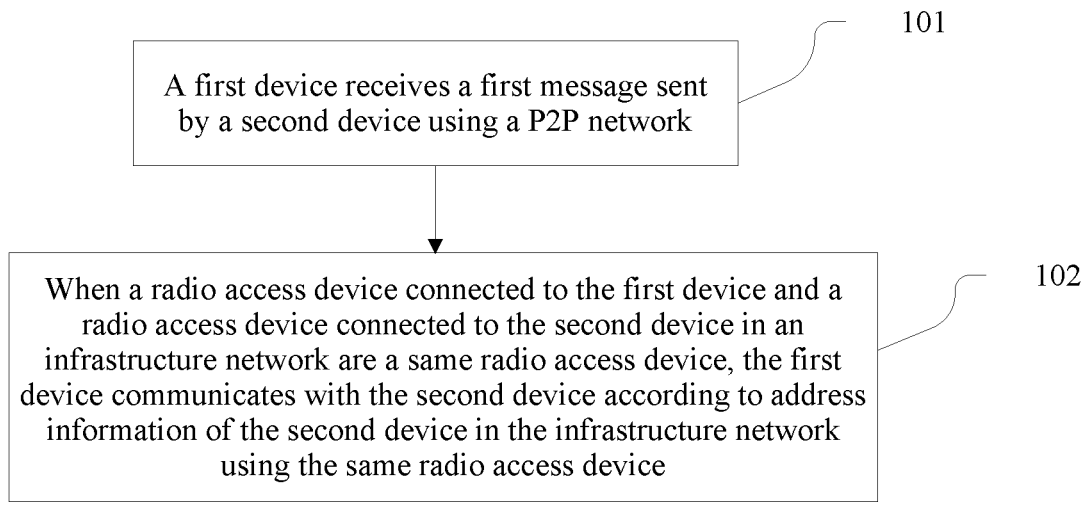
FIG. 1 is a schematic diagram of an embodiment of a communication method according to embodiments of the present disclosure.

Referring to FIG. 1, an embodiment of the communication method according to the embodiments of the present disclosure includes the following steps.

Step 101: A first device receives a first message sent by a second device using a P2P network.

It may be understood that this step is performed if the first device and the second device have transmitted a service using the P2P network, and both the first device and the second device have a capability of accessing an infrastructure network using a radio access device. In this embodiment, the second device accesses the infrastructure network by connecting to a radio access device. The first device may be connected to a radio access device and can know identification information of the radio access device connected to the first device.

It should be noted that, at the beginning of a procedure, the second device sends a first message to the first device. The first message includes address information of the second device in the infrastructure network and identification information of the radio access device connected to the second device in the infrastructure network.

In a network structure of the infrastructure network, a radio access device is included, and other devices may communicate with each other using the radio access device. The radio access device may be referred to as infrastructure, and the network may be referred to as an infrastructure network. A protocol used by the infrastructure network may be an IEEE 802.11 protocol.

In another network structure of the infrastructure network, devices communicate with each other directly. This network structure is referred to as a P2P network. The P2P network is a network established based on a P2P protocol.

The device establishes a connection with a radio access device, that is, connects to an infrastructure network. Alternatively, the device may also establish a P2P connection with another device, that is, connects to a P2P network. The connecting to the P2P network may be establishing a WI-FI Direct connection or may be joining an NAN network.

Step 102: When a radio access device connected to the first device and a radio access device connected to the second device in an infrastructure network are a same radio access device, the first device communicates with the second device according to address information of the second device in the infrastructure network using the same radio access device.

It should be noted that the first device may determine, according to the identification information of the radio access device connected to the second device in the infrastructure network, whether the radio access device connected to the first device and the radio access device connected to the second device in the infrastructure network are a same radio access device, and when the radio access device connected to the first device and the radio access device connected to the second device in the infrastructure network are a same radio access device, the first device may communicate with the second device according to the address information of the second device in the infrastructure network using the same radio access device connected to the second device.

In this embodiment of the present disclosure, when communicating with a second device using a P2P network, a first device may receive a message sent by the second device using the P2P network. When a radio access device connected to the first device and a radio access device connected to the second device in an infrastructure network are a same radio access device, the first device may communicate with the second device using the radio access device in the infrastructure network. In a process of performing communication using the P2P network, the first device may perform communication using the infrastructure network. Therefore, a situation in which network quality fluctuates when a P2P network is in use is effectively relieved, communication quality is ensured, and user experience is good.

In the embodiment shown in FIG. 1, that a radio access device connected to the first device and a radio access device connected to the second device in an infrastructure network are a same radio access device may further have multiple manners, which are as follows.

A radio access device connected to the first device and a radio access device connected to the second device in an infrastructure network are a same radio access device, and the first device determines that the identification information of the radio access device connected to the first device matches the identification information of the radio access device connected to the second device in the infrastructure network.

Figure 2:
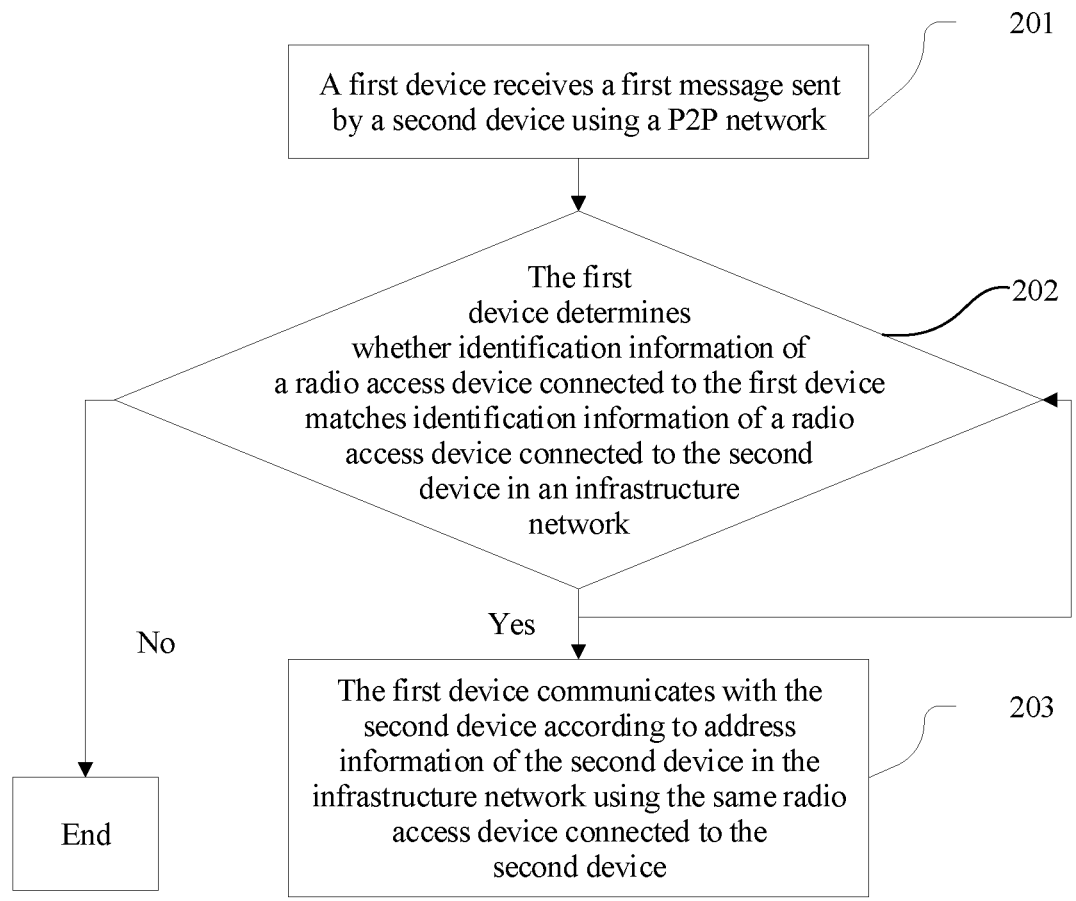
FIG. 2 is a schematic diagram of another embodiment of the communication method according to the embodiments of the present disclosure.

Referring to FIG. 2, another embodiment of the communication method according to the embodiments of the present disclosure includes the following steps.

Step 201: A first device receives a first message sent by a second device using a P2P network.

It may be understood that this step is performed if the first device and the second device have transmitted a service using the P2P network, and both the first device and the second device have a capability of accessing an infrastructure network using a radio access device. In this embodiment, the second device accesses the infrastructure network by connecting to a radio access device. The first device may be connected to a radio access device and can know identification information of the radio access device connected to the first device.

It should be noted that, at the beginning of a procedure, the second device sends a first message to the first device. The first message includes address information of the second device in the infrastructure network and identification information of the radio access device connected to the second device in the infrastructure network.

In a network structure of the infrastructure network, a radio access device is included, and other devices may communicate with each other using the radio access device. The radio access device may be referred to as infrastructure, and the network may be referred to as an infrastructure network. A protocol used by the infrastructure network may be an IEEE 802.11 protocol.

In another network structure of the infrastructure network, devices communicate with each other directly. This network structure is referred to as a peer-to-peer network, that is, a P2P network. The P2P network is a network established based on a P2P protocol.

The device establishes a connection with a radio access device, that is, connects to an infrastructure network. Alternatively, the device may also establish a P2P connection with another device, that is, connects to a P2P network.

The address information of the second device in the infrastructure network may be a MAC address of the second device, may be an IP address of the second device, or may be another device identifier of the second device, such as a device name. In actual application, the address information may also be other information obtained by converting a media access control (MAC) address, an Internet Protocol (IP) address, or another device identifier, provided that the address information can be used to perform communication in the infrastructure network. No limitation is imposed herein.

The identification information of the radio access device connected to the second device in the infrastructure network may be a MAC address of the radio access device. In actual use, the identification information may also be other identification information, such as a service set identifier (SSID) of the radio access device. No limitation is imposed herein.

The radio access device may be a radio access point, such as a radio router. It may be understood that, in actual application, the radio access device may also be another radio access device, such as a base station. No limitation is imposed herein.

The first device and the second device may be mobile terminals such as mobile phones or tablet computers, or may be devices, such as notebook computers, that can connect to a radio access device, provided that the devices can connect to a radio access device and can connect to a P2P network. No specific limitation is imposed herein.

In the embodiments of the present disclosure, the P2P network may be a WI-FI P2P network, such as a WI-FI Direct network or an NAN network, and the corresponding infrastructure network is a WI-FI infrastructure network. It may be understood that the infrastructure network may also be an infrastructure network of another type, and the P2P network may also be a P2P network of another type. No limitation is imposed herein, except that a P2P network needs to be corresponding to an infrastructure network.

A WI-FI network environment is used as an example, that is, the infrastructure network is a WI-FI infrastructure network and a P2P network is a WI-FI P2P network, such as a WI-FI Direct network or an NAN network. In the WI-FI network environment, both the first device and the second device may be terminal devices that support WI-FI. For example, the first device may be a terminal device that supports WI-FI, such as a mobile phone that supports WI-FI, and the second device may be a terminal device that supports WI-FI, such as a television that supports WI-FI.

In the WI-FI network environment, a message is sent using the WI-FI P2P network, which means that the first device and the second device have established WI-FI P2P communication based on a P2P protocol, for example, a group owner (GO) device and a group member device (Client) are determined by means of negotiation based on WI-FI Direct, the group member device and the group owner device are associated, a key is negotiated, and a WI-FI P2P connection is finally established, and then, a device sends a message to another device based on the WI-FI P2P connection. Alternatively, both the first device and the second device join an NAN network and communicate based on an NAN protocol mechanism, for example, send and receive a synchronization beacon frame, a discovery beacon frame, or a service discovery frame of the NAN.

The first message sent by the second device may be a WI-FI frame, or may be an upper-layer protocol data packet that is carried using WI-FI. The first message includes the address information of the second device in the infrastructure network and the identification information of the radio access device connected to the second device in the infrastructure network. The information may be included in a field of a frame, or the information may be included in an information element (IE) of a frame, or the information may be carried in an upper-layer data packet carried using WI-FI. For example, a frame has a field or an information element for infrastructure network address information, the field or the information element carries address information of a device in an infrastructure network, and the address information may be a MAC address of the device. For example, a frame has a field or an information element for identification information of a radio access device, and the identification information may be a MAC address of the radio access device, or may be an SSID of the radio access device, or may be an identifier of another form. No specific limitation is imposed herein.

The first device may be connected to a radio access device and can know identification information of the radio access device connected to the first device, for example, a MAC address or an SSID of the radio access device.

Step 202: The first device determines whether identification information of a radio access device connected to the first device matches identification information of a radio access device connected to the second device in an infrastructure network, and performs step 203 if the two pieces of identification information match, or ends the procedure if the two pieces of identification information do not match.

The first device determines whether the identification information of the radio access device connected to the first device matches the identification information of the radio access device connected to the second device in the infrastructure network. It may be considered that the two pieces of identification information match when the two pieces of identification information are the same. In actual application, when the two pieces of identification information have a same piece of feature information, it may also be considered that the two pieces of identification information match. It is considered that the two pieces of identification information match, provided that it can be determined, using the identification information, that the two pieces of identification information refer to a same radio access device. No specific limitation is imposed herein.

After receiving the first message sent by the second device, the first device may determine, according to the identification information of the radio access device included in the first message, whether representation of the radio access device connected to the first device matches the received identification information. When the identification information of the radio access device connected to the first device matches the identification information of the radio access device connected to the second device in the infrastructure network, the first device may determine that the first device has connected to the radio access device in the infrastructure network, that is, the first device and the second device connect to a same radio access device in the infrastructure network. Matching may refer to a situation of being the same. For example, a MAC address of the radio access device connected to the first device is 12345678, and the identification information in the message received by the first device is also 12345678 (it is assumed that it has been agreed that the message includes a MAC address). The two pieces of identification information are the same, and in this case, the two pieces of identification information match. Alternatively, it may be agreed that the message includes an SSID or other identification information. The first device may consider that the radio access device connected to the first device is the radio access device connected to the second device, and the first device and the second device access a same radio access device if the two pieces of identification information match.

Step 203: The first device communicates with the second device according to address information of the second device in the infrastructure network using the same radio access device connected to the second device.

The foregoing sent information may include address information of the first device in the infrastructure network. The address information may be a MAC address of the first device, or may be an IP address of the first device, or may be another device identifier of the first device, such as a device name.

The first device sends information to a second network using the same radio access device connected to the second device in the infrastructure network. The first device and the second device may use their addresses in the infrastructure network. The addresses used by the first device and the second device in the infrastructure network may be MAC addresses of the first device and the second device, or may be IP addresses of the first device and the second device, or may be other device identifiers of the first device and the second device, such as device names.

The first device may send information to the second device according to the address information of the second device in the infrastructure network using the radio access device when the first device determines that the identification information of the radio access device connected to the first device matches the identification information of the radio access device connected to the foregoing second device in the infrastructure network in step 202. In some embodiments, the sending information may be that the first device directly sends data to the second device according to the address information of the second device in the infrastructure network using the radio access device of the infrastructure network. For example, when the first device and the second device communicate in the P2P network, the first device sends video data to the second device. In this case, when the identification information of the radio access device connected to the first device matches the identification information of the radio access device connected to the second device in the infrastructure network, the first device may continue sending the video data to the second device according to the address information of the second device in the infrastructure network using the radio access device connected to the first device.

In this embodiment, when communicating with a second device using a P2P network, a first device may receive a message sent by the second device using the P2P network. When determining that the first device has connected to a radio access device in an infrastructure network, the first device may use the radio access device to communicate with the second device in the infrastructure network. In a process of performing communication using the P2P network, the first device may perform communication using the infrastructure network. Therefore, a situation in which network quality fluctuates when a P2P network is in use is effectively relieved, communication quality is ensured, and user experience is good.

When a radio access device connected to the first device and a radio access device connected to the second device in an infrastructure network are a same radio access device, the first device accesses the radio access device connected to the second device in the infrastructure network after the first device determines that the identification information of the radio access device connected to the first device does not match the identification information of the radio access device connected to the second device in the infrastructure network.

Figure 3:
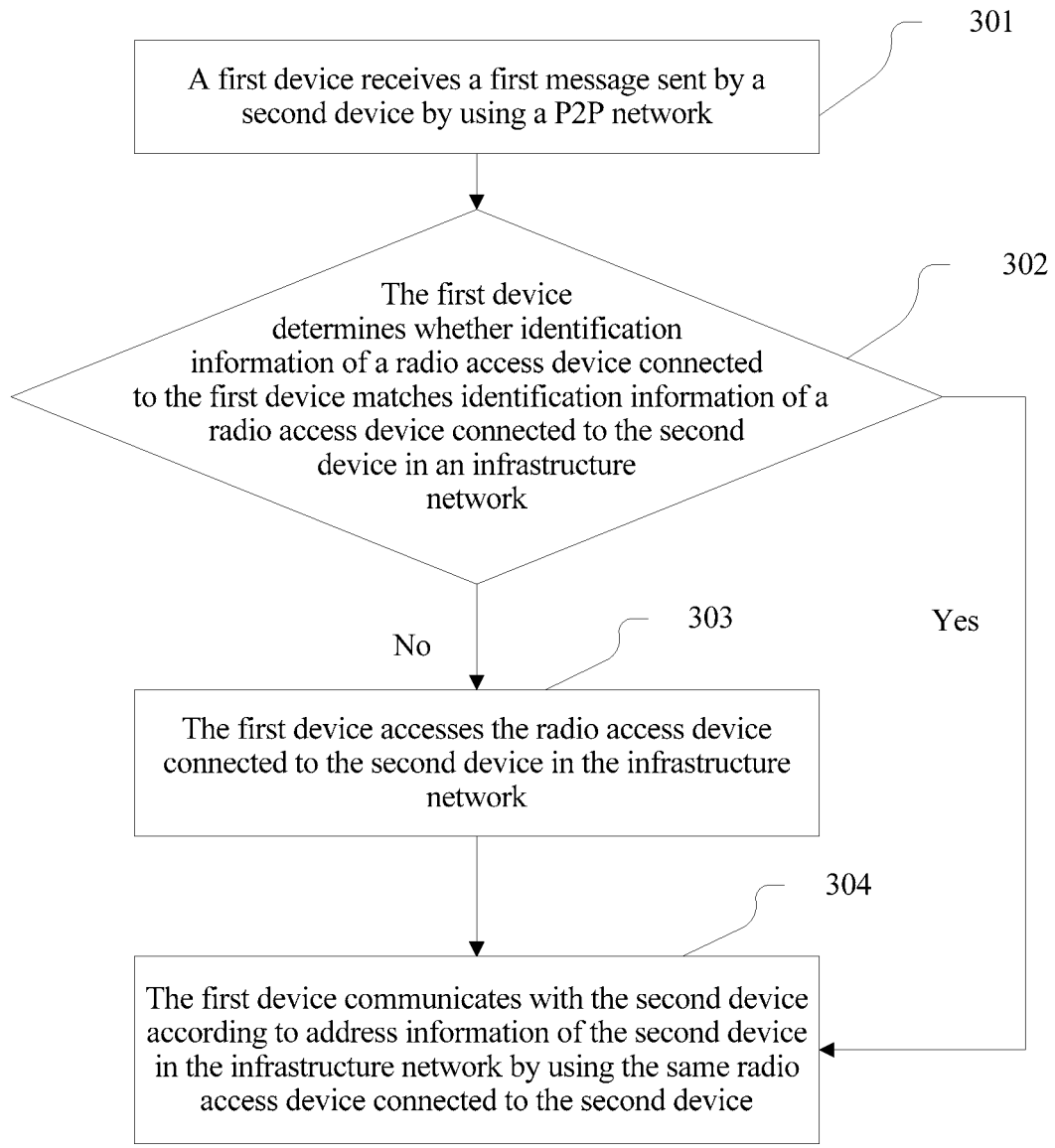
FIG. 3 is a schematic diagram of another embodiment of the communication method according to the embodiments of the present disclosure.

Referring to FIG. 3, another embodiment of the communication method according to the embodiments of the present disclosure includes the following steps.

Step 301: A first device receives a first message sent by a second device by using a P2P network.

It may be understood that this step is performed if the first device and the second device have transmitted a service using the P2P network, and both the first device and the second device have a capability of accessing an infrastructure network using a radio access device. In this embodiment, the second device accesses the infrastructure network by connecting to a radio access device. The first device may be connected to a radio access device and can know identification information of the radio access device connected to the first device.

It should be noted that, at the beginning of a procedure, the second device sends a first message to the first device. The first message includes address information of the second device in the infrastructure network and identification information of the radio access device connected to the second device in the infrastructure network.

In a network structure of the infrastructure network, a radio access device is included, and other devices may communicate with each other using the radio access device. The radio access device may be referred to as infrastructure, and the network may be referred to as an infrastructure network. A protocol used by the infrastructure network may be an IEEE 802.11 protocol.

In another network structure of the infrastructure network, devices communicate with each other directly. This network structure is referred to as a P2P network. The P2P network is a network established based on a P2P protocol.

The device establishes a connection with a radio access device, that is, connects to an infrastructure network. Alternatively, the device may also establish a P2P connection with another device, that is, connects to a P2P network.

The address information of the second device in the infrastructure network may be a MAC address of the second device. In actual application, the address information may also be other information obtained by converting a MAC address, provided that the address information can be used to perform communication in the infrastructure network. No limitation is imposed herein.

The identification information of the radio access device connected to the second device in the infrastructure network may be a MAC address of the radio access device. In actual use, the identification information may also be other identification information, such as an SSID of the radio access device. No limitation is imposed herein.

The radio access device may be a radio access point, such as a radio router. It may be understood that, in actual application, the radio access device may also be another radio access device, such as a base station. No limitation is imposed herein.

The first device and the second device may be mobile terminals such as mobile phones or tablet computers, or may be devices, such as notebook computers, that can connect to a radio access device, provided that the devices can connect to a radio access device and can connect to a P2P network. No specific limitation is imposed herein.

In this embodiment, the P2P network may be a WI-FI P2P network, and the corresponding infrastructure network is a WI-FI infrastructure network. It may be understood that the infrastructure network may also be an infrastructure network of another type, and the P2P network may also be a P2P network of another type. No specific limitation is imposed herein, except that a P2P network needs to be corresponding to an infrastructure network.

A WI-FI network environment is used as an example, that is, the infrastructure network is a WI-FI infrastructure network and a P2P network is a WI-FI P2P network. In the WI-FI network environment, both the first device and the second device may be terminal devices that support WI-FI. For example, the first device may be a terminal device that supports WI-FI, such as a mobile phone that supports WI-FI, and the second device may be a terminal device that supports WI-FI, such as a television that supports WI-FI.

In the WI-FI network environment, a message is sent using the WI-FI P2P network, which means that the first device and the second device have established WI-FI P2P communication based on a P2P protocol, for example, a GO device and a group member device (Client) are determined by means of negotiation based on WI-FI Direct, the group member device and the group owner device are associated, a key is negotiated, and a WI-FI P2P connection is finally established, and then, a device sends a message to another device based on the WI-FI P2P connection. Alternatively, both the first device and the second device join an NAN network and communicate based on an NAN protocol mechanism, for example, send and receive a synchronization beacon frame, a discovery beacon frame, or a service discovery frame of the NAN.

The first message sent by the second device may be a WI-FI frame, or may be an upper-layer protocol data packet that is carried using WI-FI. The first message includes the address information of the second device in the infrastructure network and the identification information of the radio access device connected to the second device in the infrastructure network. The information may be included in a field of a frame, or the information may be included in an IE of a frame, or the information may be carried in an upper-layer data packet carried using WI-FI. For example, a frame has a field or an information element for infrastructure network address information, the field or the information element carries address information of a device in an infrastructure network, and the address information may be a MAC address of the device. For example, a frame has a field or an information element for identification information of a radio access device, and the identification information may be a MAC address of the radio access device, or may be an SSID of the radio access device, or may be an identifier of another form. No limitation is imposed herein.

The first device may be connected to a radio access device and can know identification information of the radio access device connected to the first device, for example, a MAC address or an SSID of the radio access device.

Step 302: The first device determines whether identification information of a radio access device connected to the first device matches identification information of a radio access device connected to the second device in an infrastructure network, and performs step 304 if the two pieces of identification information match, or performs step 303 if the two pieces of identification information do not match.

The first device determines whether the identification information of the radio access device connected to the first device matches the identification information of the radio access device connected to the second device in the infrastructure network. It may be considered that the two pieces of identification information match when the two pieces of identification information are the same. In actual application, when the two pieces of identification information have a same piece of feature information, it may also be considered that the two pieces of identification information match. It is considered that the two pieces of identification information match, provided that it can be determined, using the identification information, that the two pieces of identification information refer to a same radio access device. No specific limitation is imposed herein.

After receiving the first message sent by the second device, the first device may determine, according to the identification information of the radio access device included in the first message, whether representation of the radio access device connected to the first device matches the received identification information. When the identification information of the radio access device connected to the first device matches the identification information of the radio access device connected to the second device in the infrastructure network, the first device may determine that the first device has connected to the radio access device in the infrastructure network, that is, the first device and the second device connect to a same radio access device in the infrastructure network. Matching may refer to a situation of being the same. For example, a MAC address of the radio access device connected to the first device is 12345678, and the identification information in the message received by the first device is also 12345678 (it is assumed that it has been agreed that the message includes a MAC address). The two pieces of identification information are the same, and in this case, the two pieces of identification information match. Alternatively, it may be agreed that the message includes an SSID or other identification information. If the two pieces of identification information match, the first device may consider that the radio access device connected to the first device is the radio access device connected to the second device, and the first device and the second device access a same radio access device. In this case, the first device may communicate with the second device using the same radio access device.

The first device may consider that the first device and the second device access different radio access devices when the identification information of the radio access device connected to the first device does not match the identification information of the radio access device connected to the second device in the infrastructure network.

Step 303: The first device accesses the radio access device connected to the second device in the infrastructure network.

In this embodiment, when the identification information of the radio access device connected to the first device does not match the identification information of the radio access device connected to the second device in the infrastructure network, the first device may access, according to the identification information of the radio access device connected to the second device in the infrastructure network, the radio access device connected to the second device in the infrastructure network. In this case, the first device and the second device are connected to a same radio access device.

After the first device accesses the radio access device connected to the second device in the infrastructure network, the first device may disconnect a previous connection to the radio access device previously connecting to the first device, or may maintain multiple connections. No specific limitation is imposed herein.

Step 304: The first device communicates with the second device according to address information of the second device in the infrastructure network by using the same radio access device connected to the second device.

The foregoing sent information may include address information of the first device in the infrastructure network.

The first device sends information to a second network using the radio access device. The first device and the second device may use their addresses in the infrastructure network.

The first device may send information to the second device according to the address information of the second device in the infrastructure network using the radio access device when the first device determines that the identification information of the radio access device connected to the first device matches the identification information of the radio access device connected to the foregoing second device in the infrastructure network in step 302. In some embodiments, sending information may be that the first device directly sends data to the second device according to the address information of the second device in the infrastructure network using the radio access device of the infrastructure network. For example, when the first device and the second device communicate in the P2P network, the first device sends video data to the second device. In this case, when the identification information of the radio access device connected to the first device matches the identification information of the radio access device connected to the second device in the infrastructure network, the first device may continue sending the video data to the second device according to the address information of the second device in the infrastructure network using the radio access device connected to the first device.

In this embodiment, when communicating with a second device using a P2P network, a first device may receive a message sent by the second device using the P2P network. When the first device has connected to a radio access device in an infrastructure network, the first device may use the radio access device to communicate with the second device in the infrastructure network. In a process of performing communication using the P2P network, the first device may perform communication using the infrastructure network. Therefore, a situation in which network quality fluctuates when a P2P network is in use is effectively relieved, communication quality is ensured, and user experience is good.

In addition, after the first device determines that identification information of the radio access device connected to the first device does not match identification information of a radio access device connected to the second device in the infrastructure network, the first device accesses the radio access device connected to the second device in the infrastructure network such that the first device and the second device can still communicate in the infrastructure network, communication quality is ensured, and user experience is improved.

In the embodiments shown in FIG. 1 to FIG. 3, that the first device communicates with the second device according to address information of the second device in the infrastructure network using the same radio access device connected to the second device is implemented in multiple manners, which are as follows.

The first device communicates with the second device according to address information of the second device in the infrastructure network using the connected radio access device may include that the first device sends information to the second device according to the address information of the second device in the infrastructure network using the same radio access device connected to the second device. The information includes address information of the first device in the infrastructure network.

Figure 4:
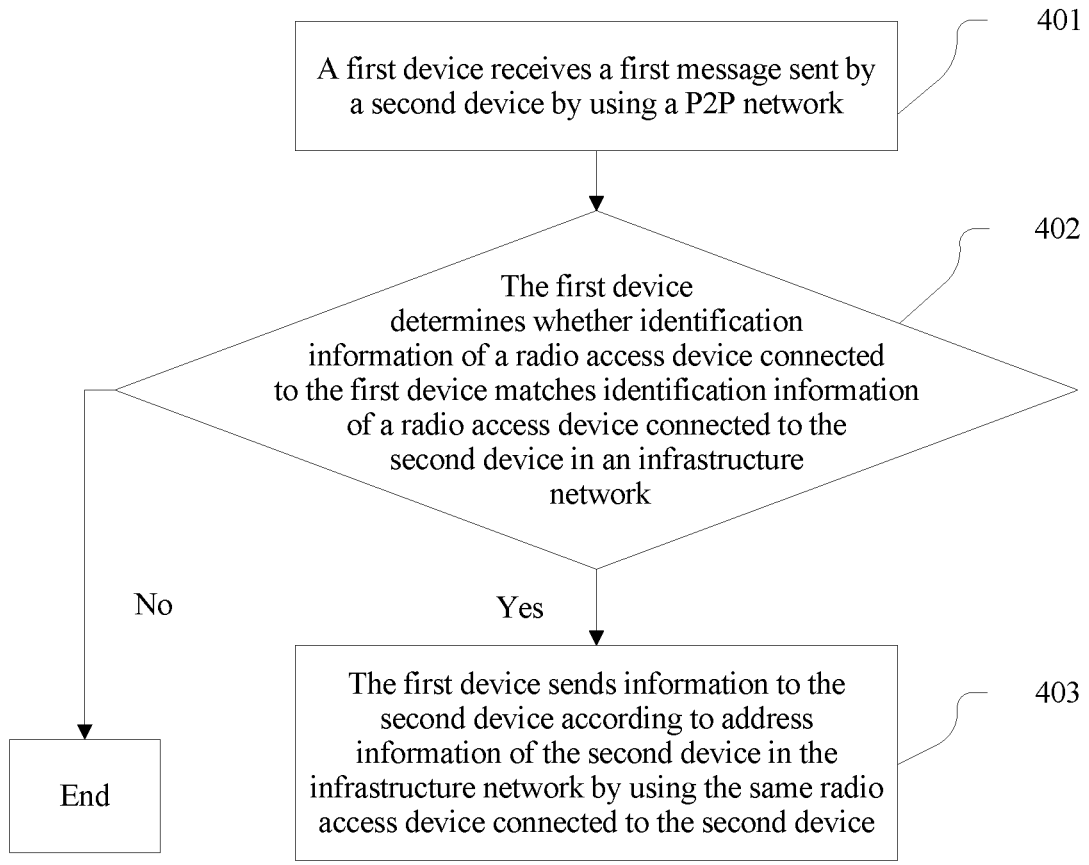
FIG. 4 is a schematic diagram of another embodiment of the communication method according to the embodiments of the present disclosure.

Referring to FIG. 4, another embodiment of the communication method according to the embodiments of the present disclosure includes the following steps.

Step 401. A first device receives a first message sent by a second device by using a P2P network.

It may be understood that this step is performed if the first device and the second device have transmitted a service using the P2P network, and both the first device and the second device have a capability of accessing an infrastructure network using a radio access device. In this embodiment, the second device accesses the infrastructure network by connecting to a radio access device.

It should be noted that, at the beginning of a procedure, the second device sends a first message to the first device. The first message includes address information of the second device in the infrastructure network and identification information of the radio access device connected to the second device in the infrastructure network.

The address information of the second device in the infrastructure network may be a MAC address of the second device, may be an IP address of the second device, or may be another device identifier of the second device, such as a device name. In actual application, the address information may also be other information obtained by converting a MAC address, an IP address, or another device identifier, provided that the address information can be used to perform communication in the infrastructure network. No limitation is imposed herein.

The identification information of the radio access device connected to the second device in the infrastructure network may be a MAC address of the radio access device. In actual use, the identification information may also be other identification information, such as an SSID of the radio access device. No limitation is imposed herein.

The radio access device may be a radio access point, such as a radio router. It may be understood that, in actual application, the radio access device may also be another radio access device, such as a base station. No limitation is imposed herein.

The first device and the second device may be mobile terminals such as mobile phones or tablet computers, or may be devices, such as notebook computers, that can connect to a radio access device, provided that the devices can connect to a radio access device and can connect to a P2P network. No limitation is imposed herein.

In this embodiment, the P2P network may be a WI-FI P2P network, and the corresponding infrastructure network is a WI-FI infrastructure network. It may be understood that the infrastructure network may also be an infrastructure network of another type, and the P2P network may also be a P2P network of another type. No limitation is imposed herein, except that a P2P network needs to be corresponding to an infrastructure network.

A WI-FI network environment is used as an example, that is, the infrastructure network is a WI-FI infrastructure network and a P2P network is a WI-FI P2P network. In the WI-FI network environment, both the first device and the second device may be terminal devices that support WI-FI. For example, the first device may be a terminal device that supports WI-FI, such as a mobile phone that supports WI-FI, and the second device may be a terminal device that supports WI-FI, such as a television that supports WI-FI.

In the WI-FI network environment, a message is sent using the WI-FI P2P network, which means that the first device and the second device have established WI-FI P2P communication based on a P2P protocol, for example, a GO device and a group member device (Client) are determined by means of negotiation based on WI-FI Direct, the group member device and the group owner device are associated, a key is negotiated, and a WI-FI P2P connection is finally established, and then, a device sends a message to another device based on the WI-FI P2P connection. Alternatively, both the first device and the second device join an NAN network and communicate based on an NAN protocol mechanism, for example, send and receive a synchronization beacon frame, a discovery beacon frame, or a service discovery frame of the NAN.

The first message sent by the second device may be a WI-FI frame, or may be an upper-layer protocol data packet that is carried using WI-FI. The first message includes the address information of the second device in the infrastructure network and the identification information of the radio access device connected to the second device in the infrastructure network. The information may be included in a field of a frame, or the information may be included in an IE of a frame, or the information may be carried in an upper-layer data packet carried using WI-FI. For example, a frame has a field or an information element for infrastructure network address information, the field or the information element carries address information of a device in an infrastructure network, and the address information may be a MAC address of the device. For example, a frame has a field or an information element for identification information of a radio access device, and the identification information may be a MAC address of the radio access device, or may be an SSID of the radio access device, or may be an identifier of another form. No limitation is imposed herein.

The first device may be connected to a radio access device and can know identification information of the radio access device connected to the first device, for example, a MAC address or an SSID of the radio access device.

Step 402: The first device determines whether identification information of a radio access device connected to the first device matches identification information of a radio access device connected to the second device in an infrastructure network, and performs step 403 if the two pieces of identification information match, or ends the procedure if the two pieces of identification information do not match.

The first device determines whether the identification information of the radio access device connected to the first device matches the identification information of the radio access device connected to the second device in the infrastructure network. It may be considered that the two pieces of identification information match when the two pieces of identification information are the same. In actual application, when the two pieces of identification information have a same piece of feature information, it may also be considered that the two pieces of identification information match. It is considered that the two pieces of identification information match, provided that it can be determined, using the identification information, that the two pieces of identification information refer to a same radio access device. No limitation is imposed herein.

After receiving the first message sent by the second device, the first device may determine, according to the identification information of the radio access device included in the first message, whether representation of the radio access device connected to the first device matches the received identification information. When the identification information of the radio access device connected to the first device matches the identification information of the radio access device connected to the second device in the infrastructure network, the first device may determine that the first device has connected to the radio access device in the infrastructure network, that is, the first device and the second device connect to a same radio access device in the infrastructure network. Matching may refer to a situation of being the same. For example, a MAC address of the radio access device connected to the first device is 12345678, and the identification information in the message received by the first device is also 12345678 (it is assumed that it has been agreed that the message includes a MAC address). The two pieces of identification information are the same, and in this case, the two pieces of identification information match. Alternatively, it may be agreed that the message includes an SSID or other identification information. The first device may consider that the radio access device connected to the first device is the radio access device connected to the second device if the two pieces of identification information match. In this case, the first device may communicate with the second device using the same radio access device connected to the second device.

It should be noted that, when the first device determines that the identification information of the radio access device connected to the first device does not match the identification information of the radio access device connected to the second device in the infrastructure network, optionally, the first device may access the radio access device connected to the second device in the infrastructure network, and communication between the first device and the second device in the infrastructure network can be implemented using the accessed same radio access device. No limitation is imposed herein.

Step 403: The first device sends information to the second device according to address information of the second device in the infrastructure network by using the same radio access device connected to the second device.

The foregoing sent information may include address information of the first device in the infrastructure network.

The first device sends information to a second network using the radio access device. The first device and the second device may use their addresses in the infrastructure network.

The first device may send information to the second device according to the address information of the second device in the infrastructure network using the radio access device when the first device determines that the identification information of the radio access device connected to the first device matches the identification information of the radio access device connected to the second device in the infrastructure network in step 402. In some embodiments, the sending information may be that the first device directly sends data to the second device according to the address information of the second device in the infrastructure network using the radio access device of the infrastructure network. For example, when the first device and the second device communicate in the P2P network, the first device sends video data to the second device. In this case, when the identification information of the radio access device connected to the first device matches the identification information of the radio access device connected to the second device in the infrastructure network, the first device may continue sending the video data to the second device according to the address information of the second device in the infrastructure network using the radio access device connected to the first device.

On the basis of the embodiment shown in FIG. 4, that the first device communicates with the second device according to address information of the second device in the infrastructure network using the same radio access device connected to the second device further includes that the first device receives information sent by the second device according to the address information of the first device in the infrastructure network using the same radio access device connected to the first device.

Figure 5:
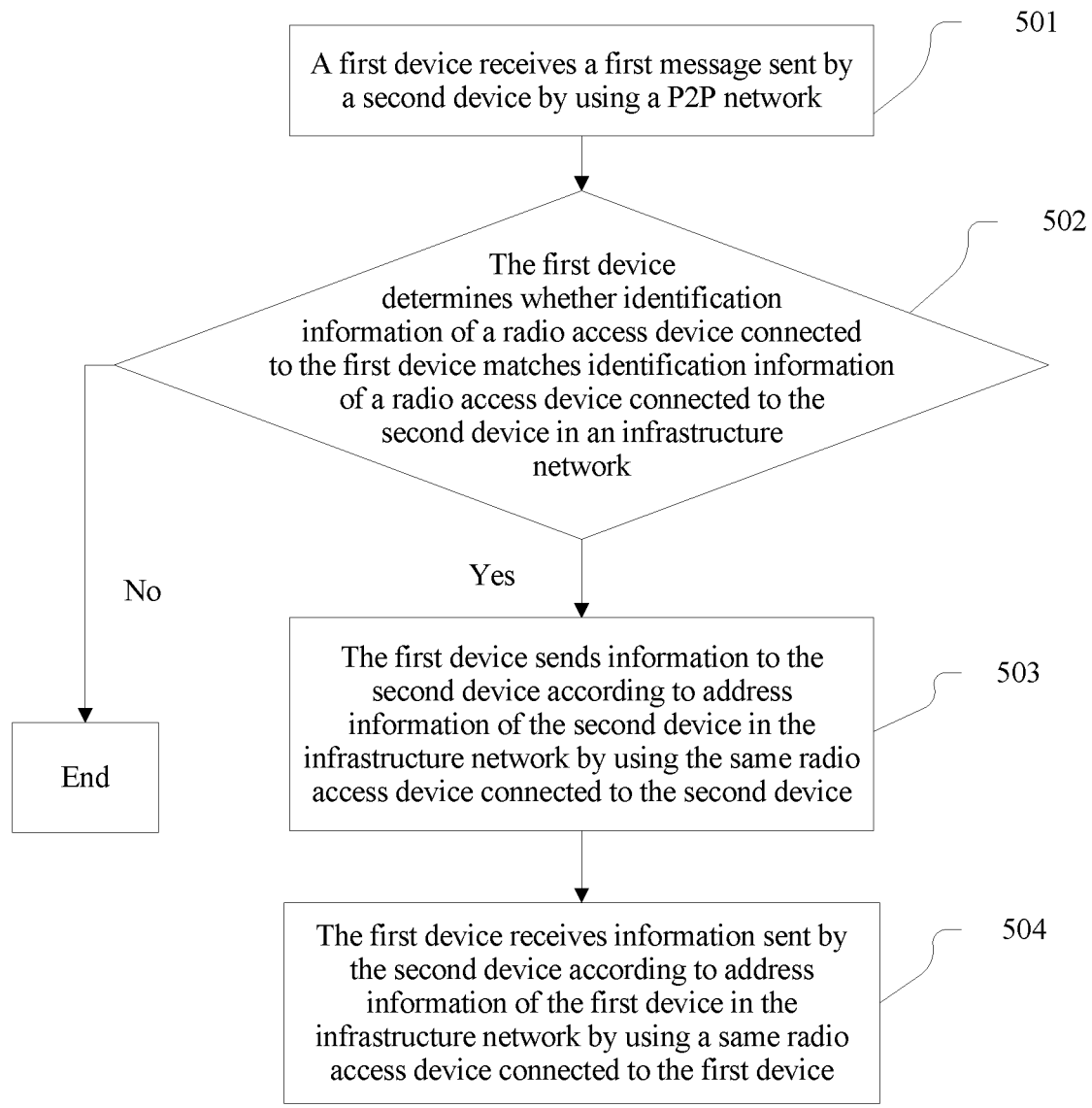
FIG. 5 is a schematic diagram of another embodiment of the communication method according to the embodiments of the present disclosure.

Referring to FIG. 5, another embodiment of the communication method according to the embodiments of the present disclosure includes the following steps.

Step 501: A first device receives a first message sent by a second device using a P2P network.

It may be understood that this step is performed if the first device and the second device have transmitted a service using the P2P network, and both the first device and the second device have a capability of accessing an infrastructure network using a radio access device. In this embodiment, the second device accesses the infrastructure network by connecting to a radio access device.

It should be noted that, at the beginning of a procedure, the second device sends a first message to the first device. The first message includes address information of the second device in the infrastructure network and identification information of the radio access device connected to the second device in the infrastructure network.

The address information of the second device in the infrastructure network may be a MAC address of the second device. In actual application, the address information may also be other information obtained by converting a MAC address, provided that the address information can be used to perform communication in the infrastructure network. No limitation is imposed herein.

The identification information of the radio access device connected to the second device in the infrastructure network may be a MAC address of the radio access device. In actual use, the identification information may also be other identification information, such as an SSID of the radio access device. No limitation is imposed herein.

The radio access device may be a radio access point, such as a radio router. It may be understood that, in actual application, the radio access device may also be another radio access device, such as a base station. No limitation is imposed herein.

The first device and the second device may be mobile terminals such as mobile phones or tablet computers, or may be devices, such as notebook computers, that can connect to a radio access device, provided that the devices can connect to a radio access device and can connect to a P2P network. No limitation is imposed herein.

In this embodiment, the P2P network may be a WI-FI P2P network, and the corresponding infrastructure network is a WI-FI infrastructure network. It may be understood that the infrastructure network may also be an infrastructure network of another type, and the P2P network may also be a P2P network of another type. No specific limitation is imposed herein, except that a P2P network needs to be corresponding to an infrastructure network.

A WI-FI network environment is used as an example, that is, the infrastructure network is a WI-FI infrastructure network and a P2P network is a WI-FI P2P network. In the WI-FI network environment, both the first device and the second device may be terminal devices that support WI-FI. For example, the first device may be a terminal device that supports WI-FI, such as a mobile phone that supports WI-FI, and the second device may be a terminal device that supports WI-FI, such as a television that supports WI-FI.

In the WI-FI network environment, a message is sent using the WI-FI P2P network, which means that the first device and the second device have established WI-FI P2P communication based on a P2P protocol, for example, a GO device and a group member device (Client) are determined by means of negotiation based on WI-FI Direct, the group member device and the group owner device are associated, a key is negotiated, and a WI-FI P2P connection is finally established, and then, a device sends a message to another device based on the WI-FI P2P connection. Alternatively, both the first device and the second device join an NAN network and communicate based on an NAN protocol mechanism, for example, send and receive a synchronization beacon frame, a discovery beacon frame, or a service discovery frame of the NAN.

The sent first message may be a WI-FI frame, or may be an upper-layer protocol data packet that is carried using WI-FI. The first message includes the address information of the second device in the infrastructure network and the identification information of the radio access device connected to the second device in the infrastructure network. The information may be included in a field of a frame, or the information may be included in an IE of a frame, or the information may be carried in an upper-layer data packet carried using WI-FI. For example, a frame has a field or an information element for infrastructure network address information, the field or the information element carries address information of a device in an infrastructure network, and the address information may be a MAC address of the device. For example, a frame has a field or an information element for identification information of a radio access device, and the identification information may be a MAC address of the radio access device, or may be an SSID of the radio access device, or may be an identifier of another form. No specific limitation is imposed herein.

The first device may be connected to a radio access device and can know identification information of the radio access device. For example, the first device knows a MAC address of the radio access device, or the first device knows an SSID of the radio access device.

Step 502: The first device determines whether identification information of a radio access device connected to the first device matches identification information of a radio access device connected to the second device in an infrastructure network, and performs step 503 if the two pieces of identification information match, or ends the procedure if the two pieces of identification information do not match.

The first device determines whether the identification information of the radio access device connected to the first device matches the identification information of the radio access device connected to the second device in the infrastructure network. It may be considered that the two pieces of identification information match when the two pieces of identification information are the same. In actual application, when the two pieces of identification information have a same piece of feature information, it may also be considered that the two pieces of identification information match. It is considered that the two pieces of identification information match, provided that it can be determined, according to the identification information, that the two pieces of identification information refer to a same radio access device. No limitation is imposed herein.

After receiving the first message sent by the second device, the first device may determine, according to the identification information of the radio access device included in the first message, whether representation of the radio access device connected to the first device matches the received identification information. When the identification information of the radio access device connected to the first device matches the identification information of the radio access device connected to the second device in the infrastructure network, the first device may determine that the first device has connected to the radio access device in the infrastructure network, that is, the first device and the second device connect to a same radio access device in the infrastructure network. Matching may refer to a situation of being the same. For example, a MAC address of the radio access device connected to the first device is 12345678, and the identification information in the message received by the first device is also 12345678 (it is assumed that it has been agreed that the message includes a MAC address). The two pieces of identification information are the same, and in this case, the two pieces of identification information match. Alternatively, it may be agreed that the message includes an SSID or other identification information. If the two pieces of identification information match, the first device may consider that the radio access device connected to the first device is the radio access device connected to the second device. In this case, the first device may communicate with the second device using the same radio access device connected to the second device.

It should be noted that, when the first device determines that the identification information of the radio access device connected to the first device does not match the identification information of the radio access device connected to the second device in the infrastructure network, the procedure may be ended as shown in FIG. 5, or optionally, the procedure may not be ended, for example, the first device may access the radio access device connected to the second device in the infrastructure network, and communication between the first device and the second device in the infrastructure network can be implemented using the accessed same radio access device. No limitation is imposed herein.

Step 503: The first device sends information to the second device according to address information of the second device in the infrastructure network by using the same radio access device connected to the second device.

The first device may send information to the second device according to the address information of the foregoing second device in the infrastructure network using the foregoing radio access device when the first device determines that the identification information of the radio access device connected to the first device matches the identification information of the foregoing radio access device in step 502. The sent information includes address information of the first device in the infrastructure network.

Step 504: The first device receives information sent by the second device according to address information of the first device in the infrastructure network by using a same radio access device connected to the first device.

The information sent in step 503 includes the address information of the first device in the infrastructure network. Therefore, the second device may send information according to the address information of the first device in the infrastructure network using the connected radio access device. In this case, the first device may receive the information sent by the second device according to the address information of the first device in the infrastructure network using the same radio access device connected to the first device. The information may be data sent by the second device to the first device.

After the first device determines that the identification information of the radio access device connected to the first device matches the identification information of the radio access device and before the first device communicates with the second device according to the address information using the same radio access device connected to the second device, the following step is further included that the first device sends a second message to the second device using the P2P network or the infrastructure network, where the second message includes address information of the first device in the infrastructure network, and in this case, that the first device communicates with the second device according to the address information of the second device in the infrastructure network using the radio access device may include that the first device sends information to the second device according to the address information of the second device in the infrastructure network using the radio access device, and/or the first device receives information sent by the second device according to the address information of the first device in the infrastructure network using the radio access device.

Figure 6:
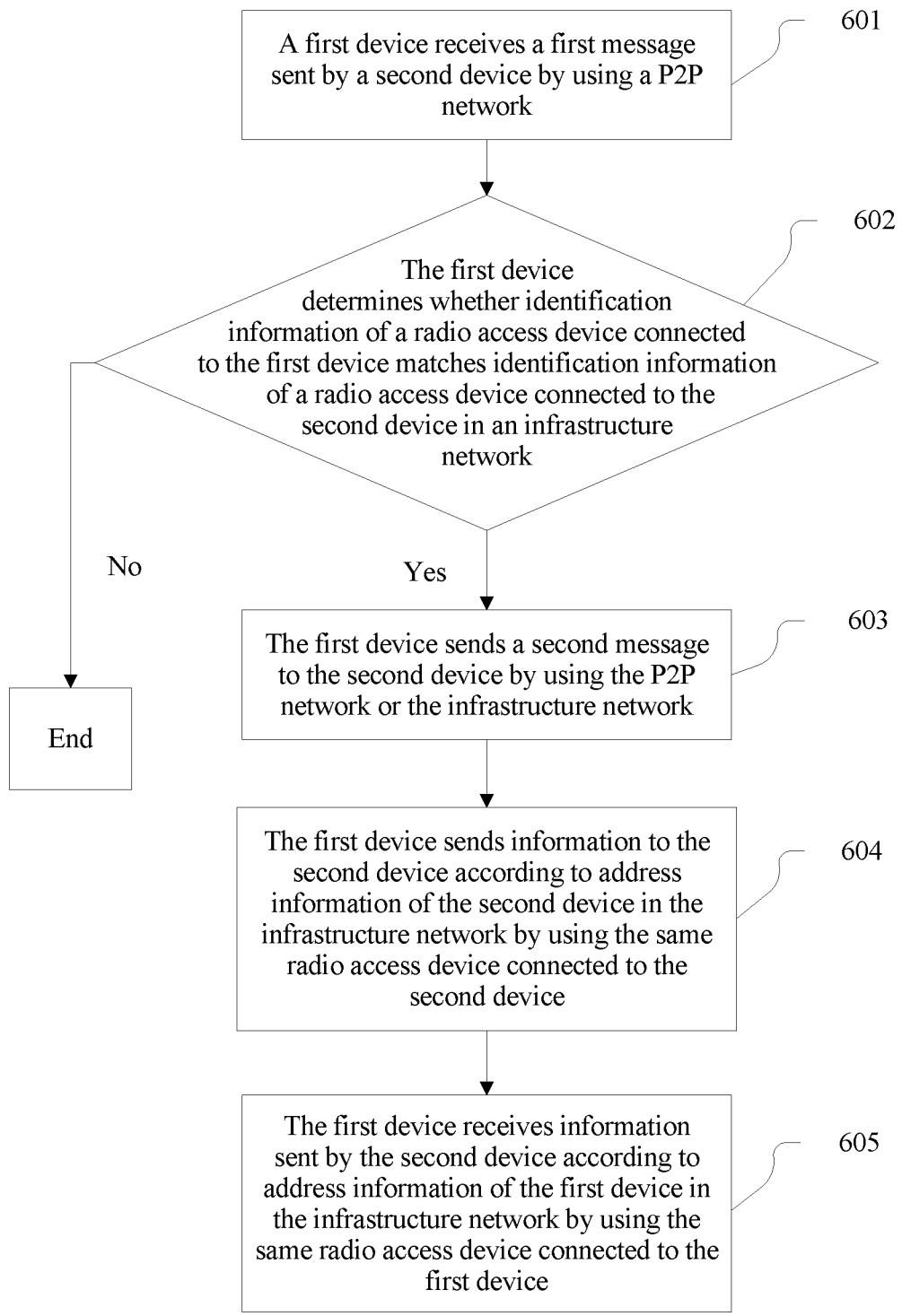
FIG. 6 is a schematic diagram of another embodiment of the communication method according to the embodiments of the present disclosure.

Referring to FIG. 6, another embodiment of the communication method according to the embodiments of the present disclosure includes the following steps.

Step 601: A first device receives a first message sent by a second device by using a P2P network.

It may be understood that this step is performed if the first device and the second device have transmitted a service using the P2P network, and both the first device and the second device have a capability of accessing an infrastructure network using a radio access device. In this embodiment, the second device accesses the infrastructure network by connecting to a radio access device.

It should be noted that, at the beginning of a procedure, the second device sends a first message to the first device. The first message includes address information of the second device in the infrastructure network and identification information of the radio access device connected to the second device in the infrastructure network.

The address information of the second device in the infrastructure network may be a MAC address of the second device. In actual application, the address information may also be other information obtained by converting a MAC address, provided that the address information can be used to perform communication in the infrastructure network. No limitation is imposed herein.

The identification information of the radio access device connected to the second device in the infrastructure network may be a MAC address of the radio access device. In actual use, the identification information may also be other identification information, such as an SSID of the radio access device. No limitation is imposed herein.

The radio access device may be a radio access point, such as a radio router. It may be understood that, in actual application, the radio access device may also be another radio access device, such as a base station. No limitation is imposed herein.

The first device and the second device may be mobile terminals such as mobile phones or tablet computers, or may be devices, such as notebook computers, that can connect to a radio access device, provided that the devices can connect to a radio access device and can connect to a P2P network. No limitation is imposed herein.

In this embodiment, the P2P network may be a WI-FI P2P network, and the corresponding infrastructure network is a WI-FI infrastructure network. It may be understood that the infrastructure network may also be an infrastructure network of another type, and the P2P network may also be a P2P network of another type. No limitation is imposed herein, except that a P2P network needs to be corresponding to an infrastructure network.

A WI-FI network environment is used as an example, that is, the infrastructure network is a WI-FI infrastructure network and a P2P network is a WI-FI P2P network. In the WI-FI network environment, both the first device and the second device may be terminal devices that support WI-FI. For example, the first device may be a terminal device that supports WI-FI, such as a mobile phone that supports WI-FI, and the second device may be a terminal device that supports WI-FI, such as a television that supports WI-FI.

In the WI-FI network environment, a message is sent using the WI-FI P2P network, which means that the first device and the second device have established WI-FI P2P communication based on a P2P protocol, for example, a GO device and a group member device (Client) are determined by means of negotiation based on WI-FI Direct, the group member device and the group owner device are associated, a key is negotiated, and a WI-FI P2P connection is finally established, and then, a device sends a message to another device based on the WI-FI P2P connection. Alternatively, both the first device and the second device join an NAN network and communicate based on an NAN protocol mechanism, for example, send and receive a synchronization beacon frame, a discovery beacon frame, or a service discovery frame of the NAN.

The first message sent by the second device may be a WI-FI frame, or may be an upper-layer protocol data packet that is carried using WI-FI. The first message includes the address information of the second device in the infrastructure network and the identification information of the radio access device connected to the second device in the infrastructure network. The information may be included in a field of a frame, or the information may be included in an IE of a frame, or the information may be carried in an upper-layer data packet carried using WI-FI. For example, a frame has a field or an information element for infrastructure network address information, the field or the information element carries address information of a device in an infrastructure network, and the address information may be a MAC address of the device. For example, a frame has a field or an information element for identification information of a radio access device, and the identification information may be a MAC address of the radio access device, or may be an SSID of the radio access device, or may be an identifier of another form. No limitation is imposed herein.

The first device may be connected to a radio access device and can know identification information of the radio access device. For example, the first device knows a MAC address of the radio access device, or the first device knows an SSID of the radio access device.

Step 602: The first device determines whether identification information of a radio access device connected to the first device matches identification information of a radio access device connected to the second device in an infrastructure network, and performs step 603 if the two pieces of identification information match, or ends the procedure if the two pieces of identification information do not match.

The first device determines whether the identification information of the radio access device connected to the first device matches the identification information of the radio access device connected to the second device in the infrastructure network. It may be considered that the two pieces of identification information match when the two pieces of identification information are the same. In actual application, when the two pieces of identification information have a same piece of feature information, it may also be considered that the two pieces of identification information match. It is considered that the two pieces of identification information match, provided that it can be determined, using the identification information, that the two pieces of identification information refer to a same radio access device. No limitation is imposed herein.

After receiving the first message sent by the second device, the first device may determine, according to the identification information of the radio access device included in the first message, whether representation of the radio access device connected to the first device matches the received identification information. When the identification information of the radio access device connected to the first device matches the identification information of the radio access device, the first device may determine that the first device has connected to the radio access device in the infrastructure network, that is, the first device and the second device connect to a same radio access device in the infrastructure network. Matching may refer to a situation of being the same. For example, a MAC address of the radio access device connected to the first device is 12345678, and the identification information in the message received by the first device is also 12345678 (it is assumed that it has been agreed that the message includes a MAC address). The two pieces of identification information are the same, and in this case, the two pieces of identification information match. Alternatively, it may be agreed that the message includes an SSID or other identification information. If the two pieces of identification information match, the first device may consider that the radio access device connected to the first device is the radio access device connected to the second device. In this case, the first device may communicate with the second device using the same radio access device connected to the second device.

It should be noted that, when the first device determines that identification information of the radio access device connected to the first device does not match the identification information of the radio access device connected to the second device in the infrastructure network, optionally, the first device may access the radio access device connected to the second device in the infrastructure network, and communication between the first device and the second device in the infrastructure network can be implemented using the accessed same radio access device. No specific limitation is imposed herein.

Step 603: The first device sends a second message to the second device by using the P2P network or the infrastructure network.

It may be understood that, in this step, the first device may send the second message to the second device using the P2P network or the infrastructure network. When the second message is sent using the P2P network, the second message may be sent using a channel that is originally used for communication using the P2P network. When the second message is sent using the infrastructure network, the second message may be sent according to the address information of the second device in the infrastructure network using the foregoing determined radio access device. The second message includes address information of the first device in the infrastructure network.

Step 604: The first device sends information to the second device according to address information of the second device in the infrastructure network by using the same radio access device connected to the second device.

Step 605: The first device receives information sent by the second device according to address information of the first device in the infrastructure network by using the same radio access device connected to the first device.

The second device may send information to the first device according to the address information of the first device in the infrastructure network using the same radio access device connected to the first device. In this case, as a receiver, the first device receives the information sent by the second device according to the address information of the first device in the infrastructure network using the radio access device.

It should be noted that, in this embodiment, for "The first device sends information to the second device according to address information of the second device in the infrastructure network by using the radio access device" described in step 604 and "The first device receives information sent by the second device according to address information of the first device in the infrastructure network by using the radio access device" described in step 605, it may be understood that, in actual application, for the content described in step 604 and the content described in step 605, in some embodiments, only the content described in one step may occur, in some other embodiments, the content described in both the two steps may occur, but an occurrence sequence of the two steps may be different from that in this embodiment, and therefore, no specific limitation is imposed herein.

In the embodiments shown in FIG. 4 to FIG. 6, multiple implementation manners of communicating, by the first device, with the second device according to the address information of the second device in the infrastructure network using the connected radio access device are further described. It may be understood that, in actual application, there may also be another implementation manner. No limitation is imposed herein.

The embodiments shown in FIG. 4 to FIG. 6 describe specific implementation manners of communicating, by the first device, with the second device according to the address information of the second device in the infrastructure network using the connected radio access device such that the communication method can be implemented in a more flexible manner.

In actual application, on the basis of the embodiments shown in FIG. 1 to FIG. 6, authentication may be performed on the first device and the second device before the first device communicates with the second device according to the address information of the second device in the infrastructure network using the connected radio access device. In this case, the first message that is sent by the second device using the P2P network and received by the first device may further include first authentication data. The authentication data is used for authentication between the first device and the second device. A function of the authentication is to determine, when the first device and the second device communicate in the infrastructure network, that a peer device in the communication is a peer device in the communication between the first device and the second device in the P2P network, which may prevent a potential security problem and improve security.

A specific authentication process may be the following manners.

Manner 1: The first message further includes first authentication data. The first authentication data becomes shared information known to both the first device and the second device, and when determining, in the infrastructure network, that the peer device indeed has the shared information, the first device and the second device may authenticate the peer device as the peer device in the communication in the P2P network.

After the first device determines that the identification information of the radio access device connected to the first device matches the identification information of the radio access device and before the first device sends the information to the second device according to the address information of the second device in the infrastructure network using the radio access device, it may further include that the first device sends first authentication execution data to the second device using the radio access device, where the first authentication execution data is data obtained after being processed by the first device according to the first authentication data, the second device performs authentication on the first device according to the first authentication data and the first authentication execution data, that is, determines whether the received first authentication execution data matches the first authentication data, and the authentication succeeds when the received first authentication execution data matches the first authentication data, that is, the second device authenticates the first device as indeed a peer device communicating with the second device in the P2P network, or vice versa, that is, the second device sends second authentication execution data to the first device using the radio access device, where the second authentication execution data is data obtained after being processed by the second device according to the first authentication data, the first device performs authentication on the second device according to the first authentication data and the second authentication execution data, that is, determines whether the received second authentication execution data matches the first authentication data, and the authentication succeeds when the received second authentication execution data matches the first authentication data, that is, the first device authenticates the second device as indeed a peer device communicating with the first device in the P2P network. For example, when the first device is a first wireless station STA1, the second device is a second wireless station STA2, and the radio access device is an access point, the STA1 receives, in the P2P network, PreShareInfo1 sent by the STA2, the STA1 sends, to the STA2 using the access point, information (that is, PreShareInfo11) obtained by processing the PreShareInfo1, and the STA2 may authenticate the STA1 according to whether the PreShareInfo1 matches the PreShareInfo11, or vice versa, that is, the STA2 sends, to the STA1 using the access point, information (that is, PreShareInfo12) obtained by processing the PreShareInfo1, and the STA1 may authenticate the STA2 according to whether the PreShareInfo1 matches the PreShareInfo12.

Manner 2: The first message further includes second authentication data.

After the first device determines that the identification information of the radio access device connected to the first device matches the identification information of the radio access device and before the first device sends the information to the second device according to the address information of the second device in the infrastructure network using the radio access device, the first device sends third authentication data to the second device using the P2P network or using the radio access device, the second authentication data and the third authentication data become shared information known to both the first device and the second device, and when determining, in the infrastructure network, that the peer device indeed has the shared information, the first device and the second device may authenticate the peer device as the peer device in the communication in the P2P network. Further, the first device sends third authentication execution data to the second device using the radio access device, where the third authentication execution data is data obtained after being processed according to the shared second authentication data and third authentication data (that is, the shared information), the second device performs authentication on the first device according to the third authentication execution data and the shared second authentication data and third authentication data, that is, determines whether the received third authentication execution data matches the shared second authentication data and third authentication data, and the authentication succeeds when the received third authentication execution data matches the shared second authentication data and third authentication data, or vice versa, that is, the second device sends fourth authentication execution data to the first device using the radio access device, where the fourth authentication execution data is data obtained after being processed according to the shared second authentication data and third authentication data (that is, the shared information), the first device may perform authentication on the second device according to the fourth authentication execution data and the shared second authentication data and third authentication data, that is, determines whether the received fourth authentication execution data matches the shared second authentication data and third authentication data, and the authentication succeeds when the received fourth authentication execution data matches the shared second authentication data and third authentication data. For example, when the first device is a first wireless station STA1, the second device is a second wireless station STA2, and the radio access device is an access point, after the STA1 receives, in the P2P network, PreShareInfo1 sent by the STA2, the STA1 may send PreShareInfo2 to the STA2 using the P2P network or using the access point, then the STA1 sends, to the STA2 using the access point, information (that is, PreShareInfo11) obtained by processing the PreShareInfo1+PreShareInfo2, and the STA2 may authenticate the STA1 according to whether the PreShareInfo11 matches the PreShareInfo1+PreShareInfo2, or vice versa, that is, the STA2 sends, to the STA1 using the access point, information (that is, PreShareInfo12) obtained by processing the PreShareInfo1+PreShareInfo2, and the STA1 may authenticate the STA2 according to whether the PreShareInfo12 matches the Pre ShareInfo1+PreShareInfo2.

In the foregoing several examples, the processing method for processing the shared information into authentication execution data is an algorithm known to the first device and the second device, and this algorithm may be specified in a communications protocol. In the foregoing several examples, the determining method for determining whether authentication data matches is also an algorithm known to the first device and the second device, and this algorithm may be specified in a communications protocol. Determining whether matching succeeds may include processing self-owned shared authentication data according to a commonly known method for processing data into authentication execution data, and determining whether the processed data is the same as the received authentication execution data. If the processed data is the same as the received authentication execution data, the authentication is successful. If the second device processes self-owned shared information, that is, the first authentication data, into a piece of data (it is assumed that the data is data A), after the first authentication execution data sent by the first device is received, the second device compares the data A obtained by performing processing by the second device and the received first authentication execution data. The authentication is successful if the data A is the same as the received first authentication execution data.

It should be noted that the foregoing several authentication methods are merely used as examples to describe an authentication process between the first device and the second device after the first device determines that the identification information of the radio access device connected to the first device matches the identification information of the radio access device and before the first device sends information to the second device according to the address information of the second device in the infrastructure network using the radio access device. In an actual application process, there may be another authentication process. No specific limitation is imposed herein.

Figure 7:
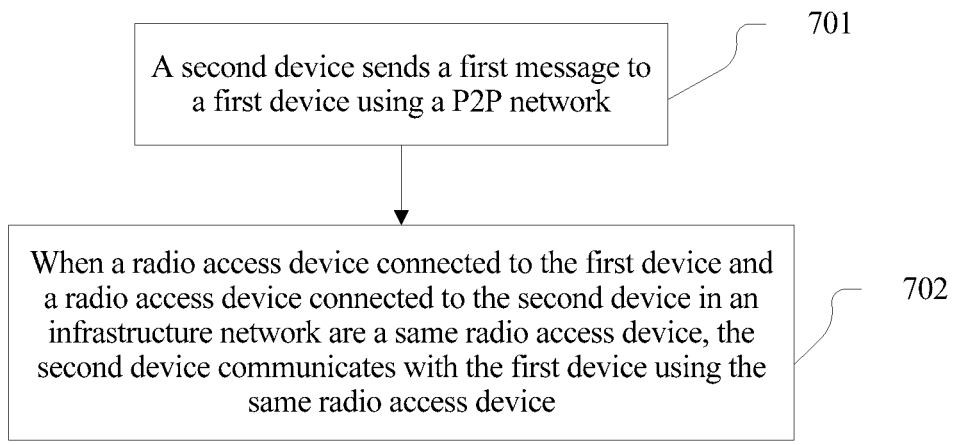
FIG. 7 is a schematic diagram of another embodiment of the communication method according to the embodiments of the present disclosure.

The following describes the communication method from another side. Referring to FIG. 7, another embodiment of the communication method according to the embodiments of the present disclosure includes the following steps.

Step 701: A second device sends a first message to a first device using a P2P network.

It should be noted that the first message includes address information of the second device in an infrastructure network and identification information of a radio access device connected to the second device in the infrastructure network.

It may be understood that this step is performed if the first device and the second device have transmitted a service using the P2P network, and both the first device and the second device have a capability of accessing an infrastructure network using a radio access device. In this embodiment, the second device accesses the infrastructure network by connecting to a radio access device.

In a network structure of the infrastructure network, a radio access device is included, and other devices may communicate with each other using the radio access device. The radio access device may be referred to as infrastructure, and the network may be referred to as an infrastructure network. A protocol used by the infrastructure network may be an IEEE 802.11 protocol.

In another network structure of the infrastructure network, devices communicate with each other directly. This network structure is referred to as a P2P network. The P2P network is a network established based on a P2P protocol.

The device may establish a connection with a radio access device, that is, connects to an infrastructure network. Alternatively, the device may also establish a P2P connection with another device, that is, connects to a P2P network.

The first device may determine whether identification information of a radio access device connected to the first device matches the identification information of the radio access device connected to the second device in the infrastructure network. When the second device determines that the identification information of the radio access device connected to the second device matches the identification information of the radio access device, the first device can determine that the second device has connected to the radio access device in the infrastructure network, that is, the first device and the second device connect to a same radio access device in the infrastructure network. In this case, the first device may communicate with the second device according to the address information of the second device in the infrastructure network using the connected radio access device.

Step 702: When a radio access device connected to the first device and a radio access device connected to the second device in an infrastructure network are a same radio access device, the second device communicates with the first device using the same radio access device.

When the radio access device connected to the first device and the radio access device connected to the second device in the infrastructure network are a same radio access device, the first device communicates with the second device using the radio access device. In another direction, the second device communicates with the first device.

In this embodiment, when communicating with the first device using the P2P network, the second device may send a message to the first device using the P2P network. When the radio access device connected to the first device and the radio access device connected to the second device in the infrastructure network are a same radio access device, the first device may communicate with the second device using the connected same radio access device in the infrastructure network. In a process of performing communication using the P2P network, the second device may perform communication using the infrastructure network. Therefore, a situation in which network quality fluctuates when a P2P network is in use is effectively relieved, communication quality is ensured, and user experience is good.

In the embodiment shown in FIG. 7, that the second device communicates with the first device using the connected radio access device in the infrastructure network is implemented in multiple manners, which are further as follows.

The second device communicates with the first device using the connected radio access device in the infrastructure network may include that the second device receives information sent by the second device. The information includes address information of the first device in the infrastructure network.

Figure 8:
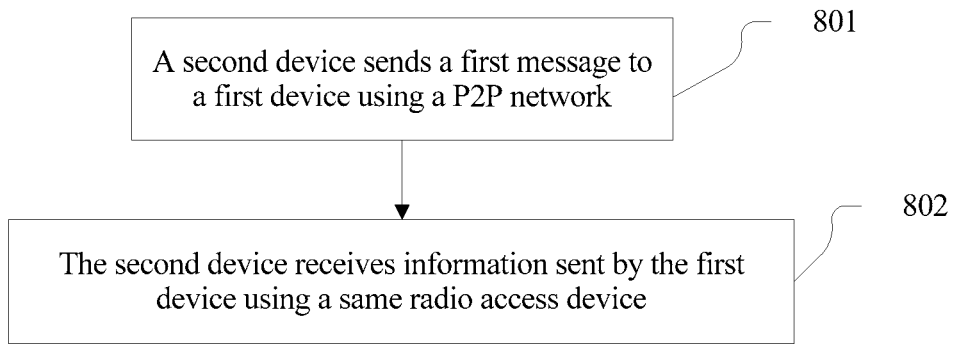
FIG. 8 is a schematic diagram of another embodiment of the communication method according to the embodiments of the present disclosure.

Referring to FIG. 8, another embodiment of the communication method according to the embodiments of the present disclosure includes the following steps.

Step 801: A second device sends a first message to a first device using a P2P network.

It should be noted that the first message includes address information of the second device in an infrastructure network and identification information of a radio access device connected to the second device in the infrastructure network.

It may be understood that this step is performed if the second device and the first device have transmitted a service using the P2P network, and both the second device and the first device have a capability of accessing an infrastructure network using a radio access device. In this embodiment, the first device accesses the infrastructure network by connecting to a radio access device.

The first device may determine whether identification information of a radio access device connected to the first device matches the identification information of the radio access device connected to the second device in the infrastructure network. When the first device determines that the identification information of the radio access device connected to the first device matches the identification information of the radio access device, the first device may communicate with the second device according to the address information of the second device in the infrastructure network using the connected radio access device.

The address information of the first device in the infrastructure network may be a MAC address of the first device. In actual application, the address information may also be other information obtained by converting a MAC address, provided that the address information can be used to perform communication in the infrastructure network. No limitation is imposed herein.

The identification information of the radio access device connected to the first device in the infrastructure network may be a MAC address of the radio access device. In actual use, the identification information may also be other identification information, such as an SSID of the radio access device. No limitation is imposed herein.

The radio access device may be a radio access point, such as a radio router. It may be understood that, in actual application, the radio access device may also be another radio access device, such as a base station. No limitation is imposed herein.

The second device and the first device may be mobile terminals such as mobile phones or tablet computers, or may be devices, such as notebook computers or televisions, that can connect to a radio access device, provided that the devices can connect to a radio access device and can connect to a P2P network. No limitation is imposed herein.

The first device may be connected to a radio access device and can know identification information of the radio access device. For example, the first device knows a MAC address of the radio access device, or the first device knows an SSID of the radio access device.

In this embodiment, the P2P network may be a WI-FI P2P network, and the corresponding infrastructure network is a WI-FI infrastructure network. It may be understood that the infrastructure network may also be an infrastructure network of another type, and the P2P network may also be a P2P network of another type. No limitation is imposed herein, except that a P2P network needs to be corresponding to an infrastructure network.

A WI-FI network environment is used as an example, that is, the infrastructure network is a WI-FI infrastructure network and a P2P network is a WI-FI P2P network. In the WI-FI network environment, both the first device and the second device may be terminal devices that support WI-FI. For example, the first device may be a terminal device that supports WI-FI, such as a mobile phone that supports WI-FI, and the second device may be a terminal device that supports WI-FI, such as a television that supports WI-FI.

In the WI-FI network environment, a message is sent using the WI-FI P2P network, which means that the first device and the second device have established WI-FI P2P communication based on a P2P protocol, for example, a GO device and a group member device (Client) are determined by means of negotiation based on WI-FI Direct, the group member device and the group owner device are associated, a key is negotiated, and a WI-FI P2P connection is finally established, and then, a device sends a message to another device based on the WI-FI P2P connection. Alternatively, both the first device and the second device join an NAN network and communicate based on an NAN protocol mechanism, for example, send and receive a synchronization beacon frame, a discovery beacon frame, or a service discovery frame of the NAN.

The first message sent by the second device may be a WI-FI frame, or may be an upper-layer protocol data packet that is carried using WI-FI. The first message includes the address information of the second device in the infrastructure network and the identification information of the radio access device connected to the second device in the infrastructure network. The information may be included in a field of a frame, or the information may be included in an EI of a frame, or the information may be carried in an upper-layer data packet carried using WI-FI. For example, a frame has a field or an information element for infrastructure network address information, the field or the information element carries address information of a device in an infrastructure network, and the address information may be a MAC address of the device. For example, a frame has a field or an information element for identification information of a radio access device, and the identification information may be a MAC address of the radio access device, or may be an SSID of the radio access device, or may be an identifier of another form. No specific limitation is imposed herein.

Step 802. The second device receives information sent by the first device using the same radio access device.

It should be noted that the information that is sent by the first device using the same radio access device and received by the second device includes address information of the first device in the infrastructure network.

The second device communicates with the first device. In another direction, the first device communicates with a first network.

On the basis of the embodiment shown in FIG. 8, that the second device communicates with the first device using the connected radio access device in the infrastructure network may further include that the second device sends information to the first device according to the address information of the first device in the infrastructure network using the same radio access device.

Figure 9:
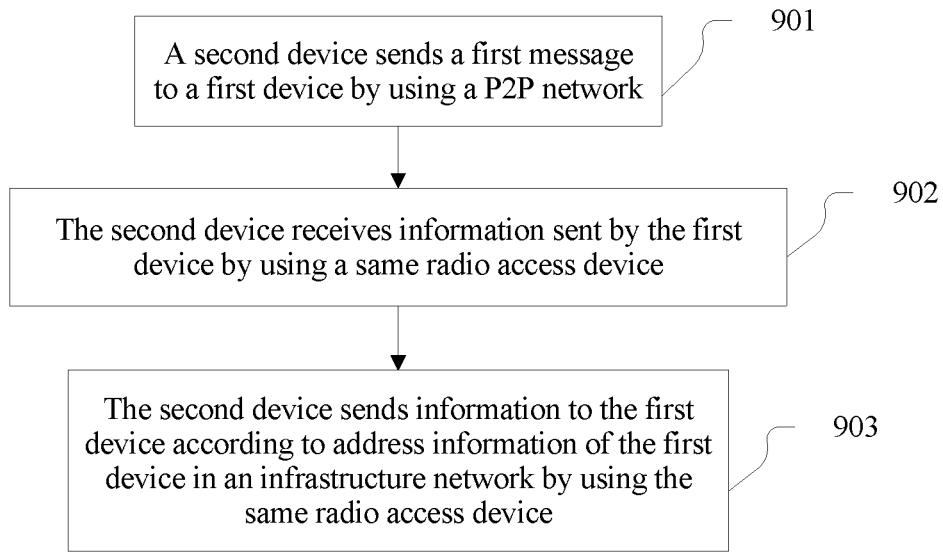
FIG. 9 is a schematic diagram of another embodiment of the communication method according to the embodiments of the present disclosure.

Referring to FIG. 9, another embodiment of the communication method according to the embodiments of the present disclosure includes the following steps.

Step 901: A second device sends a first message to a first device by using a P2P network.

It should be noted that the first message includes address information of the second device in an infrastructure network and identification information of a radio access device connected to the second device in the infrastructure network.

It may be understood that this step is performed if the second device and the first device have transmitted a service using the P2P network, and both the second device and the first device have a capability of accessing an infrastructure network using a radio access device. In this embodiment, the first device accesses the infrastructure network by connecting to a radio access device.

The first device may determine whether identification information of a radio access device connected to the first device matches the identification information of the radio access device connected to the second device in the infrastructure network. When the first device determines that the identification information of the radio access device connected to the first device matches the identification information of the radio access device, the first device may communicate with the second device according to the address information of the second device in the infrastructure network using the connected radio access device.

The address information of the first device in the infrastructure network may be a MAC address of the first device. In actual application, the address information may also be other information obtained by converting a MAC address, provided that the address information can be used to perform communication in the infrastructure network. No limitation is imposed herein.

The identification information of the radio access device connected to the first device in the infrastructure network may be a MAC address of the radio access device. In actual use, the identification information may also be other identification information, such as an SSID of the radio access device. No limitation is imposed herein.

The radio access device may be a radio access point, such as a radio router. It may be understood that, in actual application, the radio access device may also be another radio access device, such as a base station. No limitation is imposed herein.

The second device and the first device may be mobile terminals such as mobile phones or tablet computers, or may be devices, such as notebook computers, that can connect to a radio access device, provided that the devices can connect to a radio access device and can connect to a P2P network. No limitation is imposed herein.

The first device may be connected to a radio access device and can know identification information of the radio access device. For example, the first device knows a MAC address of the radio access device, or the first device knows an SSID of the radio access device.

In this embodiment, the P2P network may be a WI-FI P2P network, and the corresponding infrastructure network is a WI-FI infrastructure network. It may be understood that the infrastructure network may also be an infrastructure network of another type, and the P2P network may also be a P2P network of another type. No specific limitation is imposed herein, except that a P2P network needs to be corresponding to an infrastructure network.

A WI-FI network environment is used as an example, that is, the infrastructure network is a WI-FI infrastructure network and a P2P network is a WI-FI P2P network. In the WI-FI network environment, both the first device and the second device may be terminal devices that support WI-FI. For example, the first device may be a terminal device that supports WI-FI, such as a mobile phone that supports WI-FI, and the second device may be a terminal device that supports WI-FI, such as a television that supports WI-FI.

In the WI-FI network environment, a message is sent using the WI-FI P2P network, which means that the first device and the second device have established WI-FI P2P communication based on a P2P protocol, for example, a GO device and a group member device (Client) are determined by means of negotiation based on WI-FI Direct, the group member device and the group owner device are associated, a key is negotiated, and a WI-FI P2P connection is finally established, and then, a device sends a message to another device based on the WI-FI P2P connection. Alternatively, both the first device and the second device join an NAN network and communicate based on an NAN protocol mechanism, for example, send and receive a synchronization beacon frame, a discovery beacon frame, or a service discovery frame of the NAN.

The first message sent by the second device may be a WI-FI frame, or may be an upper-layer protocol data packet that is carried using WI-FI. The first message includes the address information of the second device in the infrastructure network and the identification information of the radio access device connected to the second device in the infrastructure network. The information may be included in a field of a frame, or the information may be included in an EI of a frame, or the information may be carried in an upper-layer data packet carried using WI-FI. For example, a frame has a field or an information element for infrastructure network address information, the field or the information element carries address information of a device in an infrastructure network, and the address information may be a MAC address of the device. For example, a frame has a field or an information element for identification information of a radio access device, and the identification information may be a MAC address of the radio access device, or may be an SSID of the radio access device, or may be an identifier of another form. No specific limitation is imposed herein.

Step 902: The second device receives information sent by the first device by using the same radio access device.

It should be noted that the information that is sent by the first device using the same radio access device and received by the second device includes address information of the first device in the infrastructure network.

The second device communicates with the first device. In another direction, the first device communicates with a first network.

Step 903: The second device sends information to the first device according to address information of the first device in the infrastructure network by using the same radio access device.

The information sent in step 902 includes the address information of the first device in the infrastructure network. Therefore, the second device may send information according to the address information of the first device in the infrastructure network using the connected radio access device. The information may be data sent by the first device to the second device.

Before the second device communicates with the first device using the same radio access device, the following step is further included. The second device receives a second message sent by the first device using the P2P network or the infrastructure network, where the second message includes address information of the first device in the infrastructure network.

In this case, that the second device communicates with the first device using the same radio access device may include that the second device sends information to the first device according to the address information of the first device in the infrastructure network using the same radio access device, and/or the second device receives information sent by the first device according to the address information of the second device in the infrastructure network using the same radio access device.

Figure 10:
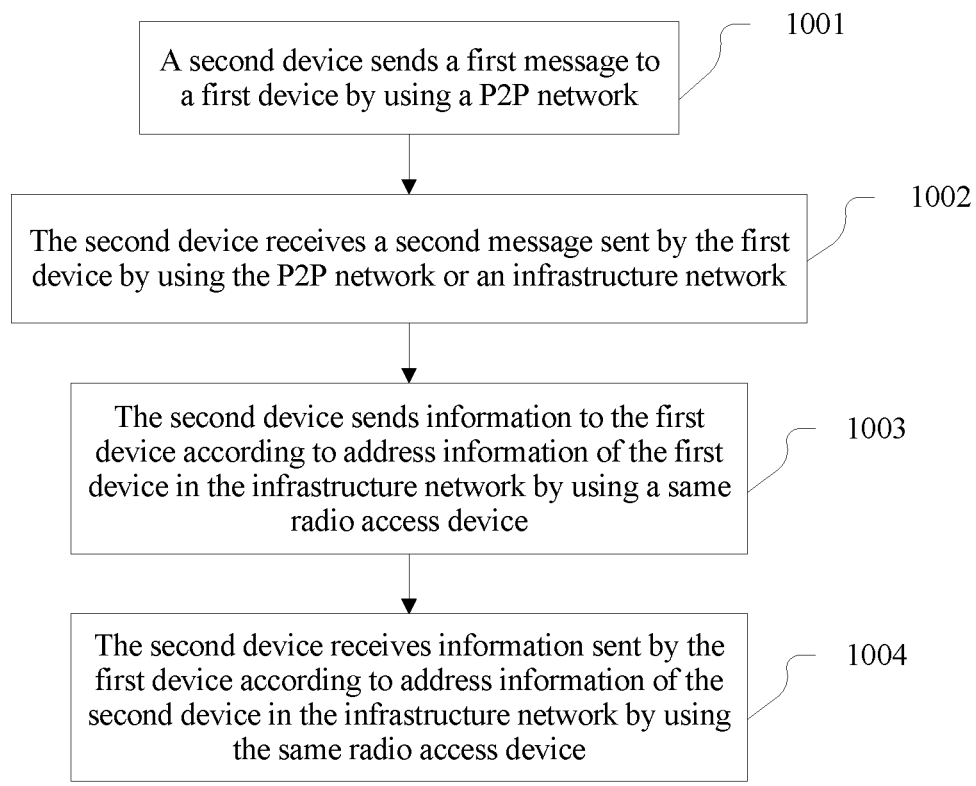
FIG. 10 is a schematic diagram of another embodiment of the communication method according to the embodiments of the present disclosure.

Referring to FIG. 10, another embodiment of the communication method according to the embodiments of the present disclosure includes the following steps.

Step 1001: A second device sends a first message to a first device by using a P2P network.

It should be noted that the first message includes address information of the second device in an infrastructure network and identification information of a radio access device connected to the second device in the infrastructure network.

It may be understood that this step is performed if the second device and the first device have transmitted a service using the P2P network, and both the second device and the first device have a capability of accessing an infrastructure network using a radio access device. In this embodiment, the first device accesses the infrastructure network by connecting to a radio access device.

The first device may determine whether identification information of a radio access device connected to the first device matches the identification information of the radio access device connected to the second device in the infrastructure network. When the first device determines that the identification information of the radio access device connected to the first device matches the identification information of the radio access device, the first device may send a message to the second device according to the address information of the second device in the infrastructure network using the connected radio access device.

The address information of the first device in the infrastructure network may be a MAC address of the first device. In actual application, the address information may also be other information obtained by converting a MAC address, provided that the address information can be used to perform communication in the infrastructure network. No limitation is imposed herein.

The identification information of the radio access device connected to the first device in the infrastructure network may be a MAC address of the radio access device. In actual use, the identification information may also be other identification information, such as an SSID of the radio access device. No limitation is imposed herein.

The radio access device may be a radio access point, such as a radio router. It may be understood that, in actual application, the radio access device may also be another radio access device, such as a base station. No limitation is imposed herein.

The second device and the first device may be mobile terminals such as mobile phones or tablet computers, or may be devices, such as notebook computers, that can connect to a radio access device, provided that the devices can connect to a radio access device and can connect to a P2P network. No specific limitation is imposed herein.

The first device may be connected to a radio access device and can know identification information of the radio access device. For example, the first device knows a MAC address of the radio access device, or the first device knows an SSID of the radio access device.

In this embodiment, the P2P network may be a WI-FI P2P network, and the corresponding infrastructure network is a WI-FI infrastructure network. It may be understood that the infrastructure network may also be an infrastructure network of another type, and the P2P network may also be a P2P network of another type. No limitation is imposed herein, except that a P2P network needs to be corresponding to an infrastructure network.

A WI-FI network environment is used as an example, that is, the infrastructure network is a WI-FI infrastructure network and a P2P network is a WI-FI P2P network. In the WI-FI network environment, both the first device and the second device may be terminal devices that support WI-FI. For example, the first device may be a terminal device that supports WI-FI, such as a mobile phone that supports WI-FI, and the second device may be a terminal device that supports WI-FI, such as a television that supports WI-FI.

In the WI-FI network environment, a message is sent using the WI-FI P2P network, which means that the first device and the second device have established WI-FI P2P communication based on a P2P protocol, for example, a GO device and a group member device (Client) are determined by means of negotiation based on WI-FI Direct, the group member device and the group owner device are associated, a key is negotiated, and a WI-FI P2P connection is finally established, and then, a device sends a message to another device based on the WI-FI P2P connection. Alternatively, both the first device and the second device join an NAN network and communicate based on an NAN protocol mechanism, for example, send and receive a synchronization beacon frame, a discovery beacon frame, or a service discovery frame of the NAN.

The first message sent by the second device may be a WI-FI frame, or may be an upper-layer protocol data packet that is carried using WI-FI. The first message includes the address information of the second device in the infrastructure network and the identification information of the radio access device connected to the second device in the infrastructure network. The information may be included in a field of a frame, or the information may be included in an IE of a frame, or the information may be carried in an upper-layer data packet carried using WI-FI. For example, a frame has a field or an information element for infrastructure network address information, the field or the information element carries address information of a device in an infrastructure network, and the address information may be a MAC address of the device. For example, a frame has a field or an information element for identification information of a radio access device, and the identification information may be a MAC address of the radio access device, or may be an SSID of the radio access device, or may be an identifier of another form. No limitation is imposed herein.

Step 1002: The second device receives a second message sent by the first device using the P2P network or an infrastructure network.

It may be understood that the first device may send the second message to the second device using the P2P network or the infrastructure network. When the second message is sent using the P2P network, the second message may be sent using a channel that is originally used for communication using the P2P network. When the second message is sent using the infrastructure network, the second message may be sent according to the address information of the second device in the infrastructure network using the foregoing determined radio access device. The second message includes address information of the first device in the infrastructure network.

Step 1003: The second device sends information to the first device according to address information of the first device in the infrastructure network by using the same radio access device.

Step 1004: The second device receives information sent by the first device according to address information of the second device in the infrastructure network by using the same radio access device.

It should be noted that, in this embodiment, for "The second device sends information to the first device according to address information of the first device in the infrastructure network by using the radio access device" described in step 1003 and "The second device receives information sent by the first device according to address information of the second device in the infrastructure network by using the radio access device" described in step 1003, it may be understood that, in actual application, for the content described in step 1003 and the content described in step 1004, in some embodiments, only the content described in one step may occur. In some other embodiments, the content described in both the two steps may occur, but an occurrence sequence of the two steps may be different from that in this embodiment, and therefore, no specific limitation is imposed herein.

In this embodiment, the P2P network may be a WI-FI P2P network, and the corresponding infrastructure network is a WI-FI infrastructure network. It may be understood that the infrastructure network may also be an infrastructure network of another type, and the P2P network may also be a P2P network of another type. No limitation is imposed herein, except that a P2P network needs to be corresponding to an infrastructure network.

In the embodiments shown in FIG. 8 to FIG. 10, multiple implementation manners of communicating, by the second device, with the first device using the connected radio access device in the infrastructure network are further described. It may be understood that, in actual application, there may also be another implementation manner. No specific limitation is imposed herein.

On the basis of the embodiment shown in FIG. 7, the embodiments shown in FIG. 8 to FIG. 10 describe specific implementation manners of communicating, by the second device, with the first device using the connected radio access device in the infrastructure network such that the communication method can be implemented in a more flexible manner.

In actual application, to prevent a potential security problem, on the basis of the embodiments shown in FIG. 7 to FIG. 10, authentication may be performed on the first device and the second device before the second device communicates with the first device using the connected radio access device in the infrastructure network. In this case, the first message sent by the second device to the first device using the P2P network may further include first authentication data. The authentication data is used for authentication between the first device and the second device. A specific authentication process is the same as the authentication process described above in terms of principle. Details are not described herein.

Persons skilled in the art may clearly learn that, for convenience and brevity of description, for specific procedures of the method described in the embodiments shown in FIG. 5 to FIG. 8, reference may be made to corresponding processes in the method embodiments shown in FIG. 1 to FIG. 4. Details are not described herein.

For better understanding of the technology, the following describes, using a specific application scenario, in detail the communication method described in the foregoing embodiment.

Figure 11:
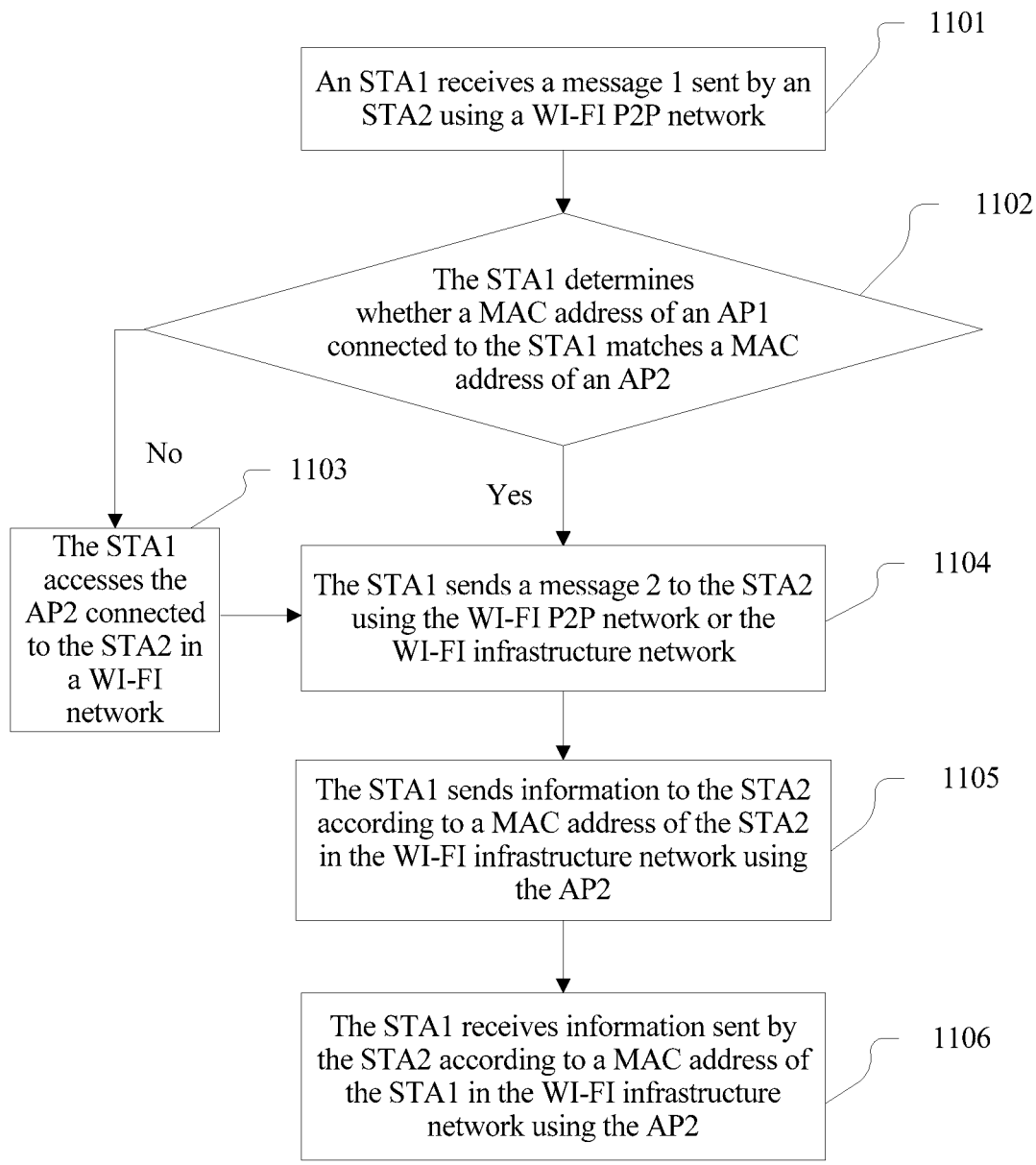
FIG. 11 is a schematic diagram of another embodiment of the communication method according to the embodiments of the present disclosure.

Referring to FIG. 11, another embodiment of the communication method according to the embodiments of the present disclosure includes the following steps.

Step 1101: A first wireless station STA1 receives a message 1 sent by second wireless station STA2 using a WI-FI P2P network.

It may be understood that this step is performed if the STA1 and the STA2 have transmitted a service using the P2P network. In this embodiment, the STA2 accesses a WI-FI infrastructure network by connecting to an AP2, where AP2 is an access point.

It should be noted that, at the beginning of a procedure, the STA2 sends a message 1 to the STA1, where the message 1 includes address information of the STA2 in the infrastructure network and a MAC address of the AP2 connecting to the STA2 in the WI-FI infrastructure network.

In this embodiment, that the P2P network is a WI-FI P2P network, and the corresponding infrastructure network is a WI-FI infrastructure network is merely used as an example for description. It may be understood that the infrastructure network may also be an infrastructure network of another type, and the P2P network may also be a P2P network of another type. No limitation is imposed herein, except that a P2P network needs to be corresponding to an infrastructure network.

The address information of the STA2 in the WI-FI infrastructure network may be a MAC address of the STA2 in the WI-FI infrastructure network. This step is described merely using the MAC address as an example. In actual application, the address information may also be other information obtained by converting a MAC address, provided that the address information can be used to perform communication in the WI-FI infrastructure network. No specific limitation is imposed herein.

The radio access device may be a radio access point, such as a radio router. It may be understood that, in actual application, the radio access device may also be another radio access device, such as a base station. Description is provided herein merely using an example in which the radio access device is an access point. No limitation is imposed herein.

The identification information of the AP2 connecting to the STA2 in the WI-FI infrastructure network may be a MAC address of the radio access device. In actual use, the identification information may also be other identification information, such as an SSID of the radio access device. No limitation is imposed herein.

The STA1 and the STA2 may be mobile terminals such as mobile phones or tablet computers, or may be devices, such as notebook computers, that can connect to a radio access device, provided that the devices can connect to a radio access device and can connect to a P2P network. No limitation is imposed herein.

The first device may be connected to a radio access device and can know identification information of the radio access device. For example, the first device knows a MAC address of the radio access device, or the first device knows an SSID of the radio access device.

In this embodiment, the P2P network may be a WI-FI P2P network, and the corresponding infrastructure network is a WI-FI infrastructure network. It may be understood that the infrastructure network may also be an infrastructure network of another type, and the P2P network may also be a P2P network of another type. No limitation is imposed herein, except that a P2P network needs to be corresponding to an infrastructure network.

The message 1 sent by the STA2 may be a WI-FI frame, or may be an upper-layer protocol data packet that is carried using WI-FI. The message 1 includes the address information of the STA2 in the WI-FI infrastructure network and the MAC address of the AP2 connecting to the STA2 in the WI-FI infrastructure network. The information may be included in a field of a frame, or the information may be included in an IE of a frame, or the information may be carried in an upper-layer data packet carried using WI-FI. For example, a frame has a field or an information element for WI-FI infrastructure network address information, the field or the information element carries address information of a device in a WI-FI infrastructure network, and the address information may be a MAC address of the device. For example, a frame has a field or an information element for identification information of the AP2, and the identification information may be a MAC address of a radio access device, or may be an SSID of the AP2, or may be an identifier of another form. No limitation is imposed herein.

Step 1102: The STA1 determines whether a MAC address of an AP1 connecting to the STA1 matches a MAC address of an AP2, and performs step 1104 if the two MAC addresses match, or performs step 1103 if the two MAC addresses do not match. Further AP1 is another access point.

The STA1 determines whether the MAC address of the AP1 connecting to the STA1 matches the MAC address of the AP2 connecting to the STA2 in the WI-FI infrastructure network. It may be considered that the two MAC addresses match when the two MAC addresses are the same. In actual application, when the two MAC addresses have a same piece of feature information, it may also be considered that the two MAC addresses match. It is considered that the two MAC addresses match, provided that it can be determined, using the MAC address, that the two MAC addresses refer to a same access point. No limitation is imposed herein.

When the MAC address of the AP1 connecting to the STA1 matches the MAC address of the AP2, the STA1 may determine that the STA1 has connected to the AP2 in the WI-FI infrastructure network, that is, the STA1 and the STA2 connect to a same access point in the WI-FI infrastructure network.

Step 1103: The STA1 accesses the AP2 connecting to the STA2 in a WI-FI network.

When the STA1 determines that the MAC address of the AP1 connecting to the STA1 does not match the MAC address of the AP2, optionally, the STA1 accesses the AP2 connecting to the STA2 in the WI-FI network. Optionally, in step 1103, a procedure may also be ended when the STA1 determines that the MAC address of the AP1 connecting to the STA1 does not match the MAC address of the AP2.

Step 1104: The STA1 sends a message 2 to the STA2 using the WI-FI P2P network or the WI-FI infrastructure network.

It may be understood that, in this step, the STA1 may send the message 2 to the STA1 using the WI-FI P2P network or the WI-FI infrastructure network. When the message 2 is sent using the WI-FI P2P network, the message 2 may be sent using a channel that is originally used for communication using the WI-FI P2P network. When the message 2 is sent using the WI-FI infrastructure network, the message 2 may be sent according to the MAC address of the STA2 in the WI-FI infrastructure network using the foregoing determined same access point (the AP2 in this embodiment). The message 2 includes a MAC address of the STA1 in the WI-FI infrastructure network.

Step 1105: The STA1 sends information to the STA2 according to a MAC address of the STA2 in the WI-FI infrastructure network using the AP2.

Step 1106: The STA1 receives information sent by the STA2 according to a MAC address of the STA1 in the WI-FI infrastructure network using the AP2.

The STA2 may send information to the STA1 according to the MAC address of the STA1 in the WI-FI infrastructure network using the AP2. In this case, as a receiver, the STA1 receives information sent by the STA2 according to the MAC address of the STA1 in the WI-FI infrastructure network using the AP2.

It should be noted that, in this embodiment, for "The STA1 sends information to the STA2 according to a MAC address of the STA2 in the WI-FI infrastructure network using the AP2" described in step 1104 and "The STA1 receives information sent by the STA2 according to a MAC address of the STA1 in the WI-FI infrastructure network using the AP2" described in step 1105, it may be understood that, in actual application, for the content described in step 1104 and the content described in step 1105, in some embodiments, only the content described in one step may occur. In some other embodiments, the content described in both the two steps may occur, but an occurrence sequence of the two steps may be different from that in this embodiment, and therefore, no specific limitation is imposed herein.

Figure 12:
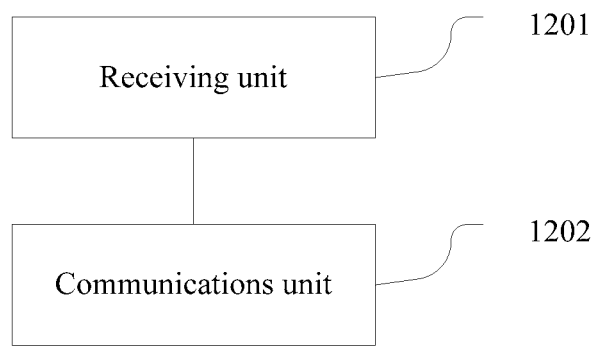
FIG. 12 is a schematic diagram of an embodiment of a first device according to the embodiments of the present disclosure.

The following describes an embodiment of a first device according to the embodiments of the present disclosure (in the embodiments of the first device according to the embodiments of the present disclosure, for operations implemented by the target device, reference may be made to the method executed by the second device in the foregoing method embodiments). Referring to FIG. 12, an embodiment of the first device according to the embodiments of the present disclosure includes a receiving unit 1201 configured to receive a first message sent by a target device using a P2P network, where the first message includes address information of the target device in an infrastructure network and identification information of a radio access device connected to the target device in the infrastructure network, and when a radio access device connected to the first device and the radio access device connected to the target device in the infrastructure network are a same radio access device, a communications unit 1202 configured to communicate with the target device according to the address information of the target device in the infrastructure network using the same radio access device.

In this embodiment, when communicating with a target device using a P2P network, a first device may receive, using a receiving unit 1201, a message sent by the target device using the P2P network. When a radio access device connected to the first device and a radio access device connected to the target device in an infrastructure network are a same radio access device, a communications unit 1202 may communicate with the target device using the radio access device in the infrastructure network. In a process of performing communication using the P2P network, the first device may perform communication using the infrastructure network. Therefore, a situation in which network quality fluctuates when a P2P network is in use is effectively relieved, communication quality is ensured, and user experience is good.

Figure 13:
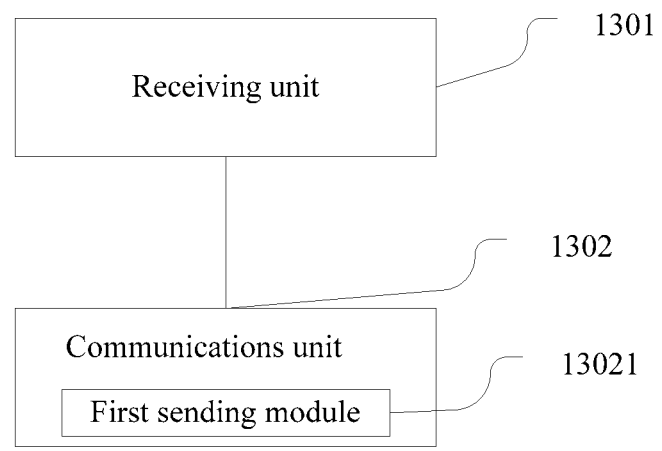
FIG. 13 is a schematic diagram of another embodiment of the first device according to the embodiments of the present disclosure.

Referring to FIG. 13, another embodiment of the first device according to the embodiments of the present disclosure includes a receiving unit 1301 configured to receive a first message sent by a target device using a P2P network, where the first message includes address information of the target device in an infrastructure network and identification information of a radio access device connected to the target device in the infrastructure network, and when a radio access device connected to the first device and the radio access device connected to the target device in the infrastructure network are a same radio access device, a communications unit 1302 configured to communicate with the target device according to the address information of the target device in the infrastructure network using the same radio access device.

The communications unit 1302 is further configured to communicate with the target device according to the address information using the same radio access device when the first device determines that identification information of the radio access device connected to the first device matches the identification information of the radio access device connected to the target device in the infrastructure network.

The communications unit 1302 may be further configured to access the radio access device connected to the target device in the infrastructure network and communicate with the target device according to the address information using the same radio access device after the first device determines that identification information of the radio access device connected to the first device does not match the identification information of the radio access device connected to the target device in the infrastructure network.

In the first device according to this embodiment, the communications unit 1302 may further include a first sending module 13021 configured to send information to the target device according to the address information of the target device in the infrastructure network using the same radio access device, where the information includes address information of the first device in the infrastructure network.

In the first device according to this embodiment, configuration of the first sending module 13021 is used as an example. It may be understood that, in some embodiments, the configuration of the first sending module 13021 may be canceled. No limitation is imposed herein.

Figure 14:
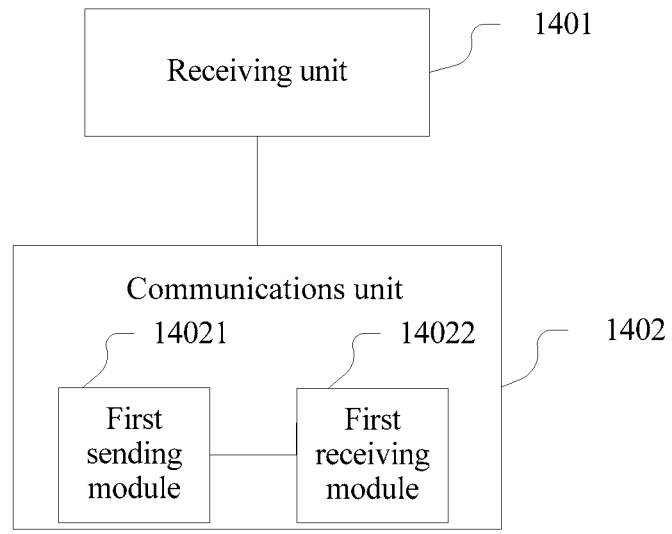
FIG. 14 is a schematic diagram of another embodiment of the first device according to the embodiments of the present disclosure.

Referring to FIG. 14, another embodiment of the first device according to the embodiments of the present disclosure includes a receiving unit 1401 configured to receive a first message sent by a target device using a P2P network, where the first message includes address information of the target device in an infrastructure network and identification information of a radio access device connected to the target device in the infrastructure network, and when a radio access device connected to the first device and the radio access device connected to the target device in the infrastructure network are a same radio access device, a communications unit 1402 configured to communicate with the target device according to the address information of the target device in the infrastructure network using the same radio access device.

The communications unit 1402 is further configured to communicate with the target device according to the address information using the same radio access device when the first device determines that identification information of the radio access device connected to the first device matches the identification information of the radio access device connected to the target device in the infrastructure network.

Optionally, the communications unit 1402 may be further configured to access the radio access device connected to the target device in the infrastructure network and communicate with the target device according to the address information using the same radio access device after the first device determines that identification information of the radio access device connected to the first device does not match the identification information of the radio access device connected to the target device in the infrastructure network.

In the first device according to this embodiment, the communications unit 1402 may further include a first sending module 14021 configured to send information to the target device according to the address information of the target device in the infrastructure network using the same radio access device, where the information includes address information of the first device in the infrastructure network, and a first receiving module 14022 configured to receive information sent by the target device according to the address information of the first device in the infrastructure network using the same radio access device.

In the first device according to this embodiment, division into the first sending module 14021 and the first receiving module 14022 is used as an example. It may be understood that, in some embodiments, the first sending module 14021 and the first receiving module 14022 may be integrated into one module. No limitation is imposed herein.

Figure 15:
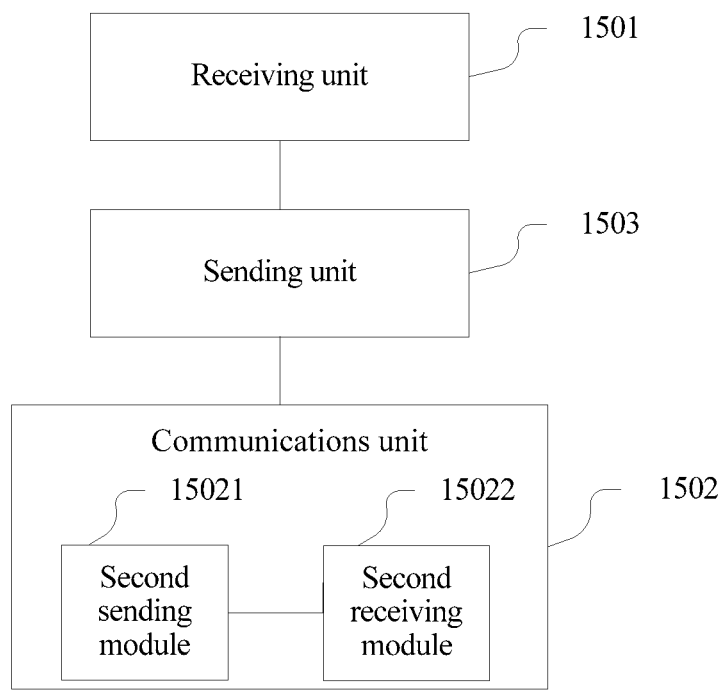
FIG. 15 is a schematic diagram of another embodiment of the first device according to the embodiments of the present disclosure.

Referring to FIG. 15, another embodiment of the first device according to the embodiments of the present disclosure includes a receiving unit 1501 configured to receive a first message sent by a target device using a P2P network, where the first message includes address information of the target device in an infrastructure network and identification information of a radio access device connected to the target device in the infrastructure network, and when a radio access device connected to the first device and the radio access device connected to the target device in the infrastructure network are a same radio access device, a communications unit 1502 configured to communicate with the target device according to the address information of the target device in the infrastructure network using the same radio access device.

The communications unit 1502 is further configured to communicate with the target device according to the address information using the same radio access device when the first device determines that identification information of the radio access device connected to the first device matches the identification information of the radio access device connected to the target device in the infrastructure network.

The communications unit 1502 may be further configured to access the radio access device connected to the target device in the infrastructure network and communicate with the target device according to the address information using the same radio access device after the first device determines that identification information of the radio access device connected to the first device does not match the identification information of the radio access device connected to the target device in the infrastructure network.

The first device according to this embodiment may further include a sending unit 1503 configured to send a second message to the target device using the P2P network or the infrastructure network before the communications unit 1502 communicates with the target device according to the address information using the same radio access device, where the second message includes address information of the first device in the infrastructure network.

In the first device according to this embodiment, the communications unit 1502 may further include a second sending module 15021 configured to send information to the target device according to the address information of the target device in the infrastructure network using the same radio access device, and/or a second receiving module 15022 configured to receive information sent by the target device according to the address information of the first device in the infrastructure network using the same radio access device.

In the first device according to this embodiment, configuration of the sending unit 1503, the second sending module 15021, and the second receiving module 15022 is used as an example. It may be understood that, in some embodiments, the configuration of the sending unit 1503, the second sending module 15021, and the second receiving module 15022 may be canceled. No limitation is imposed herein.

In the foregoing apparatus embodiments, for operations implemented by the first device, reference may be made to the method executed by the first device in the foregoing method embodiments, and for operations implemented by the target device, reference may be made to the method executed by the second device in the foregoing method embodiments.

Figure 16:
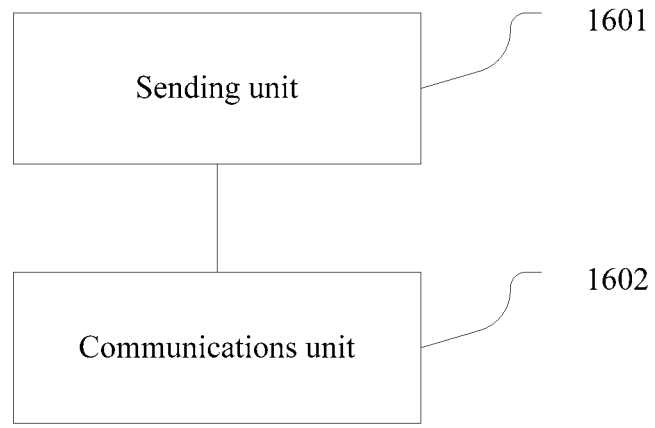
FIG. 16 is a schematic diagram of an embodiment of a second device according to the embodiments of the present disclosure.

The following describes an embodiment of a device on the other side (refer to the foregoing second device) in the embodiments of the present disclosure. Referring to FIG. 16, an embodiment of a second device according to the embodiments of the present disclosure includes a sending unit 1601 configured to send a first message to a target device using a P2P network, where the first message includes address information of the second device in an infrastructure network and identification information of a radio access device connected to the second device in the infrastructure network, and when a radio access device connected to the target device and the radio access device connected to the second device in the infrastructure network are a same radio access device, a communications unit 1602 configured to communicate with the target device using the same radio access device.

Figure 17:
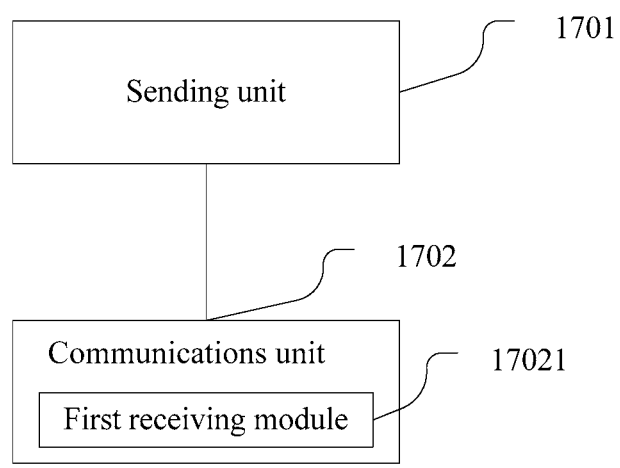
FIG. 17 is a schematic diagram of another embodiment of the second device according to the embodiments of the present disclosure.

Referring to FIG. 17, another embodiment of the second device according to the embodiments of the present disclosure includes a sending unit 1701 configured to send a first message to a target device using a P2P network, where the first message includes address information of the second device in an infrastructure network and identification information of a radio access device connected to the second device in the infrastructure network, and when a radio access device connected to the target device and the radio access device connected to the second device in the infrastructure network are a same radio access device, a communications unit 1702 configured to communicate with the target device using the same radio access device.

In the second device according to this embodiment, the communications unit 1702 may further include a first receiving module 17021 configured to receive information sent by the target device using the same radio access device, where the information includes address information of the target device in the infrastructure network.

In the second device according to this embodiment, configuration of the first receiving module 17021 is used as an example. It may be understood that, in some embodiments, the configuration of the first receiving module 17021 may be canceled. No limitation is imposed herein.

Figure 18:
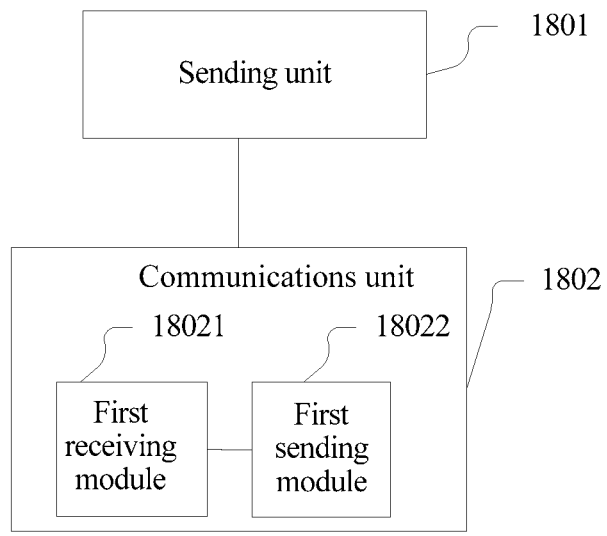
FIG. 18 is a schematic diagram of another embodiment of the second device according to the embodiments of the present disclosure.

Referring to FIG. 18, another embodiment of the second device according to the embodiments of the present disclosure includes a sending unit 1801 configured to send a first message to a target device using a P2P network, where the first message includes address information of the second device in an infrastructure network and identification information of a radio access device connected to the second device in the infrastructure network, and when a radio access device connected to the target device and the radio access device connected to the second device in the infrastructure network are a same radio access device, a communications unit 1802 configured to communicate with the target device using the same radio access device.

In the second device according to this embodiment, the communications unit 1802 may further include a first receiving module 18021 configured to receive information sent by the target device using the same radio access device, where the information includes address information of the target device in the infrastructure network, and a first sending module 18022 configured to send information to the target device according to the address information of the target device in the infrastructure network using the same radio access device.

In the second device according to this embodiment, configuration of the first receiving module 18021 and the first receiving module 18022 is used as an example. It may be understood that, in some embodiments, the configuration of the first receiving module 18021 and the first sending module 18022 may be canceled. No limitation is imposed herein.

Figure 19:
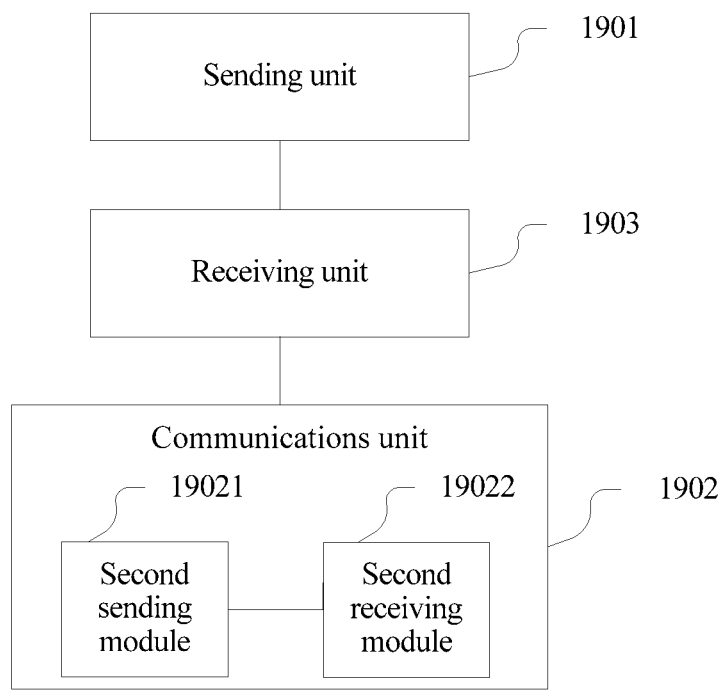
FIG. 19 is a schematic diagram of another embodiment of the second device according to the embodiments of the present disclosure.

Referring to FIG. 19, another embodiment of the second device according to the embodiments of the present disclosure includes a sending unit 1901 configured to send a first message to a target device using a P2P network, where the first message includes address information of the second device in an infrastructure network and identification information of a radio access device connected to the second device in the infrastructure network, and when a radio access device connected to the target device and the radio access device connected to the second device in the infrastructure network are a same radio access device, a communications unit 1902 configured to communicate with the target device using the same radio access device.

The second device according to this embodiment may further include a receiving unit 1903 configured to receive a second message sent by the target device using the P2P network or the infrastructure network before the communications unit 1902 communicates with the target device using the same radio access device, where the second message includes address information of the target device in the infrastructure network.

In the second device according to this embodiment, the communications unit 1902 may further include a second sending module 19021 configured to send information to the target device according to the address information of the target device in the infrastructure network using the same radio access device, and/or a second receiving module 19022 configured to receive information sent by the target device according to the address information of the second device in the infrastructure network using the same radio access device.

In the second device according to this embodiment, configuration of the receiving unit 1903, the second sending module 19021, and the second receiving module 19022 is used as an example. It may be understood that, in some embodiments, the configuration of the receiving unit 1903, the second sending module 19021, and the second receiving module 19022 may be canceled. No limitation is imposed herein.

In the embodiments of the second device according to the embodiments of the present disclosure, the address information of the second device in the infrastructure network may be a MAC address of the second device. In actual application, the address information may also be other information obtained by converting a MAC address, provided that the address information can be used to perform communication in the infrastructure network. No limitation is imposed herein.

In the embodiments of the second device according to the embodiments of the present disclosure, for operations implemented by the second device, reference may be made to the method executed by the second device in the foregoing method embodiments, and for operations implemented by the target device, reference may be made to the method executed by the first device in the foregoing method embodiments.

The identification information of the radio access device connected to the device in the infrastructure network may be a MAC address of the radio access device. In actual use, the identification information may also be other identification information, such as an SSID of the radio access device. No limitation is imposed herein.

The radio access device may be a radio access point, such as a radio router. It may be understood that, in actual application, the radio access device may also be another radio access device, such as a base station. No limitation is imposed herein.

Figure 20:
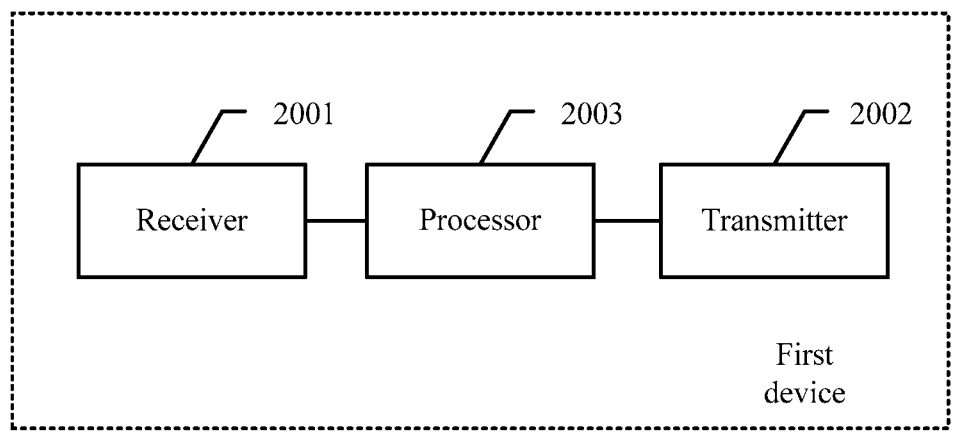
FIG. 20 is a schematic diagram of another embodiment of the first device according to the embodiments of the present disclosure.

With reference to the embodiment of FIG. 6, the following describes, from the perspective of hardware, the first device in the embodiments of the present disclosure. Referring to FIG. 20, the first device includes a receiver 2001, a transmitter 2002, and a processor 2003 (there may be one or more processors).

The first device involved in the embodiments of the present disclosure may have more or less components than the components shown in FIG. 20, may combine two or more components, or may have different component configurations or settings. Each component may be implemented in hardware that includes one or more signal processing circuits and/or application-specific integrated circuits, software, or a combination of hardware and software.

The receiver 2001 is configured to perform the following operation of receive a first message sent by a target device using a P2P network, where the first message includes address information of the target device in an infrastructure network and identification information of a radio access device connected to the target device in the infrastructure network.

The address information of the target device in the infrastructure network may be a MAC address of the target device. In actual application, the address information may also be other information obtained by converting a MAC address, provided that the address information can be used to perform communication in the infrastructure network. No limitation is imposed herein.

The identification information of the radio access device connected to the target device in the infrastructure network may be a MAC address of the radio access device. In actual use, the identification information may also be other identification information, such as an SSID of the radio access device. No limitation is imposed herein.

The radio access device may be a radio access point, such as a radio router. It may be understood that, in actual application, the radio access device may also be another radio access device, such as a base station. No limitation is imposed herein.

The processor 2003 is configured to perform the following operation of determine whether identification information of a radio access device connected to the first device matches identification information of a radio access device connected to the target device in an infrastructure network after the receiver 2001 receives the first message sent by a target device using the P2P network.

The transmitter 2002 is configured to perform the following operations send a second message to the target device using the P2P network or the infrastructure network when the processor 2003 determines that the identification information of the radio access device connected to the first device matches the identification information of the radio access device connected to the target device in the infrastructure network, where the second message includes address information of the device (the first device) in the infrastructure network, and send information to the target device according to address information of the target device in the infrastructure network using a same radio access device connected to the target device.

The receiver 2001 is further configured to perform the following operation receive information sent by the target device according to address information of the first device in the infrastructure network using the same radio access device connected to the first device.

The above merely describes an embodiment of the first device according to the embodiments of the present disclosure with reference to the method embodiment of FIG. 6. For other embodiments of the first device according to the present disclosure, reference may be referred to this embodiment. For specific operations implemented by the first device, reference may be made to the method executed by the first device in the foregoing method embodiments. Details are not described herein.

For operations implemented by the first device in embodiments of the first device according to the embodiments of the present disclosure, reference may be made to the method executed by the first device in the foregoing method embodiments, and for operations implemented by the target device, reference may be made to the method executed by the second device in the foregoing method embodiments. According to this embodiment of the present disclosure, when communicating with a target device using a P2P network, a first device may receive, using a receiver 2001, a message sent by the target device using the P2P network. When a processor 2003 determines that a connected radio access device and a radio access device connected to the target device in an infrastructure network are a same radio access device, the first device in this embodiment of the present disclosure may communicate with the target device in the infrastructure network using the radio access device and using the receiver 2001 and the transmitter 2002. In a process of performing communication using the P2P network, the first device may perform communication using the infrastructure network. Therefore, a situation in which network quality fluctuates when a P2P network is in use is effectively relieved, communication quality is ensured, and user experience is good.

Figure 21:
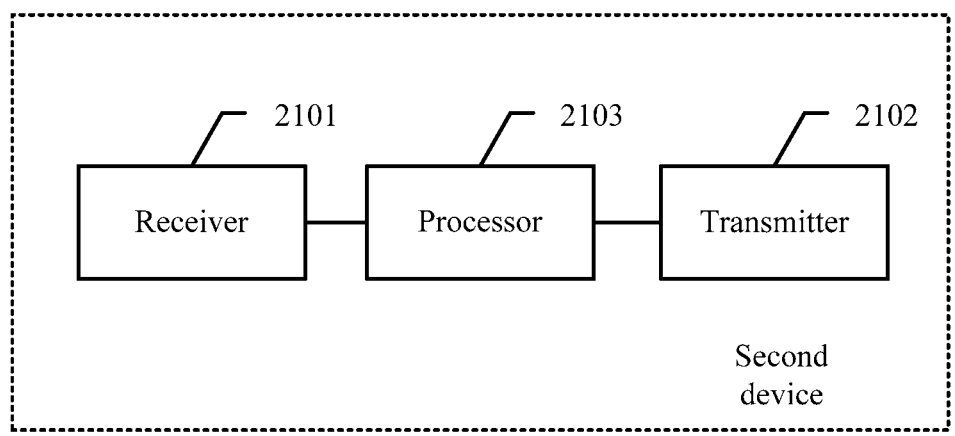
FIG. 21 is a schematic diagram of another embodiment of the second device according to the embodiments of the present disclosure.

With reference to the embodiment of FIG. 10, the following describes, from the perspective of hardware, a device on the other side (referring to the foregoing second device) in the embodiments of the present disclosure. Referring to FIG. 21, the second device includes a receiver 2101, a transmitter 2102, and a processor 2103 (there may be one or more processors).

The second device involved in the embodiments of the present disclosure may have more or less components than the components shown in FIG. 21, may combine two or more components, or may have different components configurations or settings. Each component may be implemented in hardware that includes one or more signal processing circuits and/or application-specific integrated circuits, software, or a combination of hardware and software.

The transmitter 2102 is configured to perform the following operations of send a first message to a target device using a P2P network, where the first message includes address information of the second device in an infrastructure network and identification information of a radio access device connected to the second device in the infrastructure network such that the target device determines whether identification information of a radio access device connected to the target device matches the identification information of the radio access device connected to the second device in the infrastructure network, and when the target device determines that the identification information of the radio access device connected to the target device matches the identification information of the radio access device, the target device may send a message to the second device provided in this embodiment of the present disclosure according to the address information of the second device in the infrastructure network using the connected radio access device.

The receiver 2101 is configured to perform the following operations of receive a second message sent by the target device using the P2P network or the infrastructure network, where the second message includes address information of the target device in the infrastructure network.

The address information of the target device in the infrastructure network may be a MAC address of the target device. In actual application, the address information may also be other information obtained by converting a MAC address, provided that the address information can be used to perform communication in the infrastructure network. No limitation is imposed herein.

According to this embodiment of the present disclosure, the identification information of the radio access device connected to the second device in the infrastructure network may be a MAC address of the radio access device. In actual use, the identification information may also be other identification information, such as an SSID of the radio access device. No limitation is imposed herein.

The radio access device may be a radio access point, such as a radio router. It may be understood that, in actual application, the radio access device may also be another radio access device, such as a base station. No limitation is imposed herein.

The transmitter 2102 is further configured to perform the following operation of send information to the target device according to address information of the target device in the infrastructure network using the same radio access device connected to the second device.

The receiver 2101 is further configured to perform the following operation of receive information sent by the target device according to the address information of the second device in the infrastructure network using the same radio access device connected to the second device.

The processor 2103 may be configured to perform the following operation of perform processing according to data received by the receiver 2101 and data that needs to be sent by the transmitter 2102.

The above merely describes an embodiment of the second device according to the embodiments of the present disclosure with reference to the method embodiment of FIG. 10. For other embodiments of the second device according to the present disclosure, reference may be referred to this embodiment. For specific operations implemented by the second device, reference may be made to the method executed by the second device in the foregoing method embodiments. Details are not described herein.

In the embodiments of the second device according to the embodiments of the present disclosure, for operations implemented by the second device, reference may be made to the method executed by the second device in the foregoing method embodiments, and for operations implemented by the target device, reference may be made to the method executed by the first device in the foregoing method embodiments.

According to this embodiment of the present disclosure, when communicating with a target device using a P2P network, a second device may receive, using a receiver 2101, a message sent by the target device using the P2P network. When the target device determines, according to the message, that a connected radio access device and a radio access device connected to the second device in an infrastructure network are a same radio access device, the second device may communicate with the target device in the infrastructure network using the radio access device and using the receiver 2101 and a transmitter 2102. In a process of performing communication using the P2P network, the second device may perform communication using the infrastructure network. Therefore, a situation in which network quality fluctuates when a P2P network is in use is effectively relieved, communication quality is ensured, and user experience is good.

Figure 22:
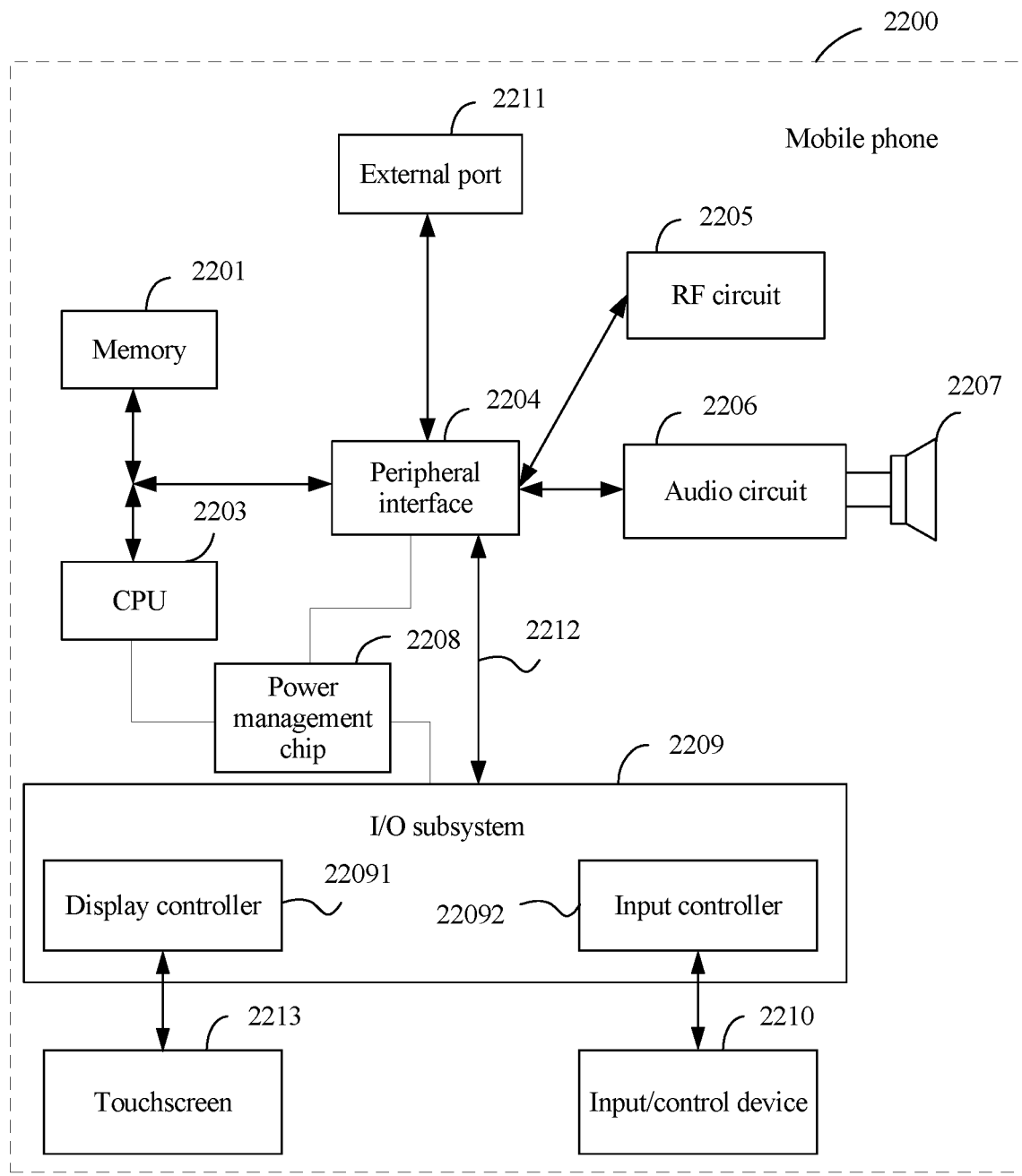
FIG. 22 is a schematic diagram of another embodiment of the first device according to the embodiments of the present disclosure.

Referring to FIG. 22, in this embodiment of the present disclosure, the first device provided in the embodiments of the present disclosure is described in detail using a mobile phone as an example.

It should be understood that the mobile phone 2200 shown in FIG. 22 is merely an example of the first device provided in the embodiments of the present disclosure, and the mobile phone 2200 may have more or less components than the components shown in FIG. 22, may combine two or more components, or may have different component configurations. Each component shown in FIG. 22 may be implemented in hardware that includes one or more signal processing circuits and/or application-specific integrated circuits, software, or a combination of hardware and software.

A mobile phone 2200 is used as an example for specific description. As shown in FIG. 22, the mobile phone 2200 includes a memory 2201, a central processing unit (CPU) 2203, a peripheral interface 2204, a radio frequency (RF) circuit 2205, an audio circuit 2206, a speaker 2207, a power management chip 2208, an input/output (I/O) subsystem 2209, another input/control device 2210, and an external port 2211. These components communicate using one or more communication buses or signal cables 2212.

It should be noted that the mobile phone 2200 provided in this embodiment is merely an example of a mobile terminal. The mobile terminal involved in the embodiments of the present disclosure may have more or less components than the components shown in FIG. 22, may combine two or more components, or may have different component configurations or settings. Each component may be implemented in hardware that includes one or more signal processing circuits and/or application-specific integrated circuits, software, or a combination of hardware and software.

The following describes in detail the mobile phone provided in this embodiment and used to perform communication in the method according to the embodiments of the present disclosure.

Memory 2201: The memory 2201 may be accessed by the CPU 2203 and the peripheral interface 2204. The memory 2201 may include a high-speed random access memory (RAM), and may further include a non-volatile memory, for example, one or more magnetic disk storages, flash memories, or other volatile solid-state memories.

Peripheral interface 2204: The peripheral interface may connect input and output peripherals of the first device to the CPU 2203 and the memory 2201.

I/O subsystem 2209: The I/O subsystem 2209 may connect input and output peripherals, such as a touchscreen 2213 (equivalent to the display in the foregoing embodiment) and the input/control device 2210, of the first device to the peripheral interface 2204. The I/O subsystem 2209 may include a display controller 22091 and one or more input controllers 22092 used for controlling input/control device 2010. The one or more input controllers 22092 receive electrical signals from the input/control device 2210 or send electrical signals to the input/control device 2210. The input/control device 2210 may include a physical button (such as a press button and a rocker button), a dial, a slider switch, a joystick, and a click scroll wheel. It should be noted that the input controllers 22092 may be connected to a keyboard, an infrared port, a universal serial bus (USB) port, or an indication device such as a mouse.

Touchscreen 2213: The touchscreen 2213 is an input port and an output port between the mobile terminal and a user and displays visual output to the user. The visual output may include an image, a text, an icon, a video, and the like.

The display controller 22091 of the I/O subsystem 2209 receives an electrical signal from the touchscreen 2213 or sends an electrical signal to the touchscreen 2213. The touchscreen 2213 detects a touch on the touchscreen 2213. The display controller 22091 converts the detected touch into interaction with a user interface object displayed on the touchscreen 2213, that is, implements man-machine interaction. The user interface object displayed on the touchscreen 2213 may be an icon for running a game, an icon for connecting to a corresponding network, or the like. It should be noted that the first device may further include an optical mouse. The optical mouse is a touch-sensitive surface that does not display visual output, or an extension of a touch-sensitive surface formed by the touchscreen 2213.

The RF circuit 2205 is mainly used to establish communication between the mobile phone 2200 and a wireless network (that is, a network side) to implement receiving and transmission of data between the mobile phone 2200 and the wireless network, for example, receiving and transmission of a short message service message, an electronic mail (e-mail), or the like. Further, the RF circuit 2205 receives and sends an RF signal. The RF signal is also referred to as an electromagnetic signal. The RF circuit 2205 converts an electrical signal into an electromagnetic signal or converts an electromagnetic signal into an electrical signal, and communicates with a communications network and another device using the electromagnetic signal. The RF circuit 2205 may include a known circuit for executing these function, and the known circuit includes but is not limited to an antenna system, an RF transceiver, one or more amplifiers, a tuner, one or more oscillators, a digital signal processor, a CODEC chip group, a subscriber identity module (SIM), or the like.

The audio circuit 2206 is mainly configured to receive audio data from the peripheral interface 2204, convert the audio data into an electrical signal, and send the electrical signal to the speaker 2207.

The speaker 2207 is configured to restore, into a sound, a voice signal received by the mobile phone 2200 from the wireless network using the RF circuit 2205, and play the sound to the user.

The power management chip 2208 is configured to supply power to the CPU 2203, the I/O subsystem 2209, and hardware connected to the peripheral interface 2204, and manage the power.

The CPU 2203 is a control center of the mobile phone 2200. The CPU 2203 connects all parts of the whole mobile phone 2200 using various interfaces and cables, and executes various functions of the mobile phone 2200 and processes data by running or executing a software program or a module or both that are stored in the memory 2201 and invoking data stored in the memory 2201, thereby performing overall monitoring on the mobile phone 2200. Optionally, the CPU 2203 may include one or more processing units. Preferably, the CPU 2203 may integrate an application processor and a modem processor. The application processor mainly processes an operating system, a user interface, an application program, and the like, and the modem processor mainly processes radio communication. It can be understood that the modem processor may either not be integrated into the processor CPU 2203.

The mobile phone 2200 further includes a power supply (such as a battery) that supplies power to all the components. Preferably, the power supply may be logically connected to the CPU 2203 using the power management system, to implement, using the power management system, functions such as management of charging, discharging, and power consumption.

Although not shown in FIG. 22, the mobile phone 2200 may further include a camera, a BLUETOOTH module, and the like. Details are not described herein.

The RF circuit 2205 may receive a message sent by another device using a P2P network. The message may be further the first message in the embodiment 10 to the embodiment 13. The first message includes address information of a target device in an infrastructure network and identification information of a radio access device connected to the target device in the infrastructure network. It may be understood that the RF circuit 2205 may receive a message for one or more times, and no specific limitation is imposed herein. It should be noted that the received first message may further carry data of multiple data types. The received first message may have data of only one data type, such as authentication data, or may have data of two or more data types.

In this embodiment of the present disclosure, the CPU 2203 included in the mobile phone 2200 may further have the following functions.

The CPU 2203 identifies a data type of data in the first message received by the RF circuit 2205, and determines whether identification information of a radio access device connected to the mobile phone 2200 matches the identification information of the radio access device received by the RF circuit 2205. When the identification information of the radio access device connected to the mobile phone 2200 matches the identification information of the radio access device received by the RF circuit 2205, the CPU 2203 communicates with the target device according to the address information of the target device in the infrastructure network using the same radio access device connected to the target device. It may be understood that, in this embodiment of the present disclosure, a manner of identifying, by the CPU 2203, data of various formats may be the manner in the foregoing embodiment. Details are not described herein.

Persons skilled in the art may understand that, although the method described in the embodiments of the present disclosure includes multiple operations or steps that occur in a particular sequence, the method may include more or less operations or steps, and these operations or steps may be performed sequentially or performed concurrently, and these sequences do not have particular sequences.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit or module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present disclosure essentially, or part, or all or some of the technical solutions may be implemented in the form of a software product. The computer software product is stored in a storage medium and includes several instructions for instructing a computer device (which may be a personal computer, a server, a device, or the like) to perform all or some of the steps of the method described in the embodiments of the present disclosure. The foregoing storage medium includes any medium that can store program code, such as a USB flash drive, a removable hard disk, a read-only memory (ROM), a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

The invention claimed is:

1. A communication method, comprising:
receiving, by a first device, a first message sent by a second device using a first network, wherein the first network comprises a peer-to-peer (P2P) network, wherein the first message comprises identification information of a second radio access device connected to the second device in an infrastructure network;
determining, by the first device, whether the first device and the second device are connected to a same radio access device based on the identification information of the second radio access device connected to the second device;
after determining that the first device and the second device are connected to the same radio access device, sending, by the first device, a second message to the second device using the infrastructure network, wherein the second message comprises address information of the first device in the infrastructure network;
sending, by the first device, first data to the second device according to address information of the second device in the infrastructure network using the second radio access device connected to the second device; and
receiving, by the first device, information sent by the second device, wherein the information is sent by the second device according to the address information of the first device in the infrastructure network using the second radio access device connected to the second device.

2. The method of claim 1, further comprising:
establishing, by the first device, the first network with the second device.

3. The method of claim 1, wherein the P2P network comprises one or more of a WI-FI Direct network or a Neighbor Awareness Networking (NAN) network.

4. The method of claim 1, wherein the infrastructure network is an IEEE 802.11 network.

5. The method of claim 1, wherein the identification information of the second radio access device is a second Service Set Identifier (SSID) of the second radio access device.

6. The method of claim 1, wherein the address information of the first device in the infrastructure network is a first media access control (MAC) address of the first device in the infrastructure network and the address information of the second device in the infrastructure network is a second MAC address of the second device in the infrastructure network.

7. The method of claim 1, wherein determining, by the first device, whether the first device and the second device are connected to a same radio access device based on the identification information of the second radio access device connected to the second device comprises determining, by the first device, whether identification information of a first radio access device connected to the first device matches the identification information of the second radio access device connected to the second device.

8. An apparatus, comprising:
at least one processor; and
a memory coupled to the at least one processor and storing programming instructions that, when executed by the at least one processor, cause the apparatus to:
receive a first message sent by a second device using a first network, wherein the first network comprises a peer-to-peer (P2P) network, wherein the first message comprises identification information of a second radio access device connected to the second device in an infrastructure network;
determine whether the apparatus and the second device are connected to a same radio access device based on the identification information of the second radio access device connected to the second device;
after determining that the apparatus and the second device are connected to the same radio access device, send a second message to the second device using the infrastructure network, wherein the second message comprises address information of the apparatus in the infrastructure network;
send first data to the second device according to address information of the second device in the infrastructure network using the second radio access device connected to the second device; and
receive information sent by the second device, wherein the information is sent by the second device according to the address information of the apparatus in the infrastructure network using the second radio access device connected to the second device.

9. The apparatus of claim 8, further comprising:
establishing, by the apparatus, the first network with the second device.

10. The apparatus of claim 8, wherein the P2P network comprises one or more of a WI-FI Direct network or a Neighbor Awareness Networking (NAN) network.

11. The apparatus of claim 8, wherein the infrastructure network is an IEEE 802.11 network.

12. The apparatus of claim 8, wherein the identification information of the second radio access device is a second Service Set Identifier (SSID) of the second radio access device.

13. The apparatus of claim 8, wherein the address information of the apparatus in the infrastructure network is a first MAC address of the apparatus in the infrastructure network and the address information of the second device in the infrastructure network is a second MAC address of the second device in the infrastructure network.

14. The apparatus of claim 8, wherein determining whether the apparatus and the second device are connected to a same radio access device based on the identification information of the second radio access device connected to the second device comprises determining whether identification information of a first radio access device connected to the apparatus matches the identification information of the second radio access device connected to the second device.

15. A system, comprising:
a first device; and
a second device, wherein the second device is configured to:
establish a first network with the first device, wherein the first network comprises a peer-to-peer (P2P) network;
send a first message to the first device using the first network, wherein the first message comprises identification information of a second radio access device connected to the second device in an infrastructure network;
wherein the first device is configured to:
receive the first message sent by the second device using the first network;
determine whether the first device and the second device are connected to a same radio access device based on the identification information of the second radio access device connected to the second device;

after determining that the first device and the second device are connected to the same radio access device based on the identification information of the second radio access device connected to the second device, send a second message to the second device using the infrastructure network, wherein the second message comprises address information of the first device in the infrastructure network;

send first data to the second device according to address information of the second device in the infrastructure network using the second radio access device connected to the second device; and receive information sent by the second device, wherein the information is sent by the second device according to the address information of the first device in the infrastructure network using the second radio access device connected to the second device.

16. The system of claim 15, wherein the P2P network comprises one or more of a WI-FI Direct network or a Neighbor Awareness Networking (NAN) network.

17. The system of claim 15, wherein the infrastructure network is an IEEE 802.11 network.

18. The system of claim 15, wherein the identification information of the second radio access device is a second Service Set Identifier (SSID) of the second radio access device.

19. The system of claim 15, wherein determining whether the first device and the second device are connected to a same radio access device based on the identification information of the second radio access device connected to the second device comprises determining whether identification information of a first radio access device connected to the first device matches the identification information of the second radio access device connected to the second device.

* * * * *